US012413503B2

United States Patent
de Souza

(10) Patent No.: US 12,413,503 B2
(45) Date of Patent: Sep. 9, 2025

(54) DEADLOCK-FREE MULTIPATH ROUTING FOR DIRECT INTERCONNECT NETWORKS

(71) Applicant: Rockport Networks Inc., Ottawa (CA)

(72) Inventor: Evandro de Souza, Kanata (CA)

(73) Assignee: Rockport Networks Inc. (CA)

( * ) Notice: Subject to any disclaimer, the term of this patent is extended or adjusted under 35 U.S.C. 154(b) by 372 days.

(21) Appl. No.: 18/025,353

(22) PCT Filed: Jun. 23, 2022

(86) PCT No.: PCT/IB2022/000359
§ 371 (c)(1),
(2) Date: Mar. 8, 2023

(87) PCT Pub. No.: WO2022/269357
PCT Pub. Date: Dec. 29, 2022

(65) Prior Publication Data
US 2023/0327976 A1    Oct. 12, 2023

Related U.S. Application Data

(60) Provisional application No. 63/214,061, filed on Jun. 23, 2021.

(51) Int. Cl.
*H04L 45/12* (2022.01)
*H04L 12/66* (2006.01)
(Continued)

(52) U.S. Cl.
CPC .............. *H04L 45/03* (2022.05); *H04L 45/24* (2013.01); *H04L 45/488* (2022.05)

(58) Field of Classification Search
None
See application file for complete search history.

(56) References Cited

U.S. PATENT DOCUMENTS 7,724,674 B2 * 5/2010 Lysne .................... H04L 45/00
370/254
10,142,219 B2 * 11/2018 Oprea .................... H04L 45/26
(Continued)

*Primary Examiner* — Kharye Pope
(74) *Attorney, Agent, or Firm* — Frost Brown Todd LLP

(57) ABSTRACT

A method of routing for direct interconnect networks which generates multiple edge-disjoint paths between all source and destination nodes, while providing deadlock-free routing. The method requires limited use of virtual layers, which makes it suitable for less complex and more energy efficient hardware devices, and inter-layer edge-disjointedness is preferably integrated, which improves the throughput capacity of multipath traffic patterns. The method allows for distributed route calculation, wherein each node is responsible for generation of its own routes without the need for a centralized algorithm controller or elected master (with global knowledge), as it is, for instance, with InfiniBand. The method also involves a method of mapping arbitrary topologies from any dimension to bi-dimensional coordinate system. In addition, the method employs a lower number of turn restrictions than other prior solutions because it uses six direction types instead of only four as used in Up*/Down*. This increase in the number of directions translates into a more diversified set of routes, and consequently, better routing solutions.

19 Claims, 20 Drawing Sheets

(51) Int. Cl.
*H04L 45/03* (2022.01)
*H04L 45/24* (2022.01)
*H04L 45/488* (2022.01)

(56) References Cited

U.S. PATENT DOCUMENTS

2006/0133282 A1* 6/2006 Ramasamy ............. H04L 45/28
  370/238
2016/0344618 A1* 11/2016 Oprea ................. H04L 47/6225

* cited by examiner

| Edge Direction | $X(v)$ | $Y(v)$ |
|---|---|---|
| LEFT-UP [LU] | $X(v_j) < X(v_i)$ | $Y(v_j) < Y(v_i)$ |
| LEFT [L] | $X(v_j) < X(v_i)$ | $Y(v_j) = Y(v_i)$ |
| LEFT-DOWN [LD] | $X(v_j) < X(v_i)$ | $Y(v_j) > Y(v_i)$ |
| RIGHT-UP [RU] | $X(v_j) > X(v_i)$ | $Y(v_j) < Y(v_i)$ |
| RIGHT [R] | $X(v_j) > X(v_i)$ | $Y(v_j) = Y(v_i)$ |
| RIGHT-DOWN [RD] | $X(v_j) > X(v_i)$ | $Y(v_j) > Y(v_i)$ |

FIG. 11

| Turn | Allowed | Turn | Allowed |
|---|---|---|---|
| 'L' | | 'R' | |
| ['L']['LU'] | False | ['R']['L'] | False |
| ['L']['RU'] | True | ['R']['LU'] | False |
| ['L']['R'] | True | ['R']['RU'] | True |
| ['L']['RD'] | True | ['R']['RD'] | True |
| ['L']['LD'] | True | ['R']['LD'] | True |
| ['L']['L'] | True | ['R']['R'] | True |
| 'LU' | | 'RD' | |
| ['LU']['L'] | True | ['RD']['L'] | True |
| ['LU']['RU'] | True | ['RD']['LU'] | False |
| ['LU']['R'] | True | ['RD']['RU'] | True |
| ['LU']['RD'] | True | ['RD']['R'] | True |
| ['LU']['LD'] | True | ['RD']['LD'] | True |
| ['LU']['LU'] | True | ['RD']['RD'] | True |
| 'RU' | | 'LD' | |
| ['RU']['L'] | False | ['LD']['L'] | True |
| ['RU']['LU'] | False | ['LD']['LU'] | False |
| ['RU']['R'] | False | ['LD']['RU'] | True |
| ['RU']['RD'] | False | ['LD']['R'] | True |
| ['RU']['LD'] | False | ['LD']['RD'] | True |
| ['RU']['RU'] | True | ['LD']['LD'] | True |

FIG. 12

12-node topology with 2 layers

Path=[(edge_1), (edge_2), (edge_3), ..., (edge_n)]
EDGE= (src_node, dst_node, port_src_node)

| Selection | Layer | Length | Order | Paths for src=1 to dst=8 |
|---|---|---|---|---|
| Y | 0 | 3 | 1 | [(1, 5, 4), (5, 7, 3), (7, 8, 0)] |
| Y | 0 | 3 | 2 | [(1, 5, 5), (5, 6, 0), (6, 8, 3)] |
| Y | 0 | 3 | 3 | [(1, 2, 0), (2, 6, 5), (6, 8, 2)] |
| N | 0 | 3 | 4 | [(1, 3, 2), (3, 4, 0), (4, 8, 5)] |
| Y | 1 | 3 | 5 | [(1, 5, 4), (5, 7, 2), (7, 8, 0)] |
| Y | 0 | 4 | 6 | [(1, 3, 3), (3, 7, 4), (7, 12, 1), (12, 8, 1)] |
| Y | 0 | 4 | 7 | [(1, 9, 1), (9, 2, 1), (2, 4, 3), (4, 8, 4)] |
| N | 1 | 4 | 8 | [(1, 5, 5), (5, 7, 3), (7, 12, 1), (12, 8, 1)] |

| Selection | Layer | Length | Order | Paths for src=9 and dst=7 |
|---|---|---|---|---|
| Y | 0 | 3 | 1 | [(9, 11, 4), (11, 12, 3), (12, 7, 0)] |
| Y | 0 | 3 | 2 | [(9, 1, 0), (1, 5, 5), (5, 7, 3)] |
| N | 1 | 3 | 3 | [(9, 11, 4), (11, 12, 2), (12, 7, 0)] |
| Y | 0 | 4 | 4 | [(9, 2, 1), (2, 4, 2), (4, 8, 5), (8, 7, 1)] |
| N | 1 | 4 | 5 | [(9, 11, 5), (11, 12, 3), (12, 8, 1), (8, 7, 1)] |

FIG. 16

Topology Parameters for Performance Analysis

| Topology | Nodes | Links | Diameter | Routes |
|---|---|---|---|---|
| 2x3x4_X_1x1x1 | 24 | 144 | 4 | 2,956 |
| 2x3x4_X_3x2x2 | 288 | 3,456 | 7 | 849,684 |
| 2x3x4_X_4x4x4 | 1536 | 18,432 | 10 | 23,943,975 |

FIG. 17

DEADLOCK-FREE MULTIPATH ROUTING FOR DIRECT INTERCONNECT NETWORKS

FIELD OF THE INVENTION

The present invention relates to routing packets in a network. More particularly, the present invention relates to the deadlock-free routing of packets along multiple paths between source and destination nodes in a direct interconnect network.

BACKGROUND OF THE INVENTION

In the quest of ever-growing computing power, high-performance computing (HPC) represents the ultimate scale-out system. The underlying interconnection network must be expanded to accommodate thousands of computing nodes. Therefore, the influence of the network is significant on application performance, energy consumption, total cost, and overall efficiency of the whole system.

Unfortunately, the state-of-the-art routing algorithms or routing schemes (which determine the path taken by a packet from a source node to a destination node in the network) fail to efficiently provide all the characteristics required to execute high-performance applications in modern direct interconnected networks. Topology-dependent routing algorithms cannot be directly applied in arbitrary topologies. Routing schemes capable of selecting paths in irregular topologies may not provide enough path redundancy to increase robustness (to reduce system downtime due to hardware failures), or for the case where an increase of throughput (i.e., the injected traffic delivered per input node) requires the use of multipaths. Moreover, existing topology-agnostic routing algorithms may require an unbounded number of hardware resources to resolve deadlocks—a situation where packet transmission cannot take place due to a resource (usually buffers or channels) waiting for another packet to release this resource. Network traffic may form a cycle of waiting resources and create deadlocks.

One of the most used routing schemes is called "wormhole routing". It is a technique where messages are pipelined through the network. Instead of storing a packet completely in a node and then transmitting it to the next node (as in the store-and-forward method), wormhole routing operates by advancing the head of a packet directly from incoming to outgoing channels. Only small parts of the packet, called flits (flow control digits), are buffered at each node. A flit is the smallest unit of information that a channel can accept or refuse (see e.g., W. J. Dally and C. L. Seitz, "Deadlock-Free Message Routing in Multiprocessor Interconnection Networks," Jan. 1, 1988. https://resolver.caltech.edu/CaltechC-STR:5231-tr-86). Flits are typically of fixed length but may be of variable length.

A wormhole-based interconnect network may incur a deadlock when a flit is unable to make progress because it needs a resource (usually buffers or channels) and is waiting on another flit to release this resource. If a sequence of waiting resources forms a cycle, the network is in deadlock (see e.g., W. J. Dally, and B. P. Towles. *Principles and Practices of Interconnection Networks*. Morgan Kaufmann Publishers, 2004.)

An example of deadlock in a network is exemplified in FIG. 1. Connection M1 holds channels b and c, but can only advance if it is able to acquire channel d. Connection M2, at the same instant, controls channels d and a. In the same manner, it can only make progress if it is possible to acquire channel b. The problem of deadlock occurs in this situation, because neither connection will release control of the channel needed by the other.

Deadlocks can be prevented by imposing a partial order on the resources and enforcing that a flit may only allocate a resource in ascending order. Thus, each resource can appear only at a single point in the ordering. One approach to guarantee ascending order is to group the resources into numbered classes; for instance, dividing the use of two buffer classes based on whether a flit has passed a dateline, which may, in effect, break the cycle of buffer dependencies.

Another technique to prevent deadlock is to partially restrict physical routes. If adequate restrictions are placed on routing, then you can remove enough dependencies between resources so that the resulting channel dependency graph is acyclic. Examples of this technique are Dimension Order Routing (see e.g., W. J. Dally, and B. P. Towles. *Principles and Practices of Interconnection Networks*. Morgan Kaufmann Publishers, 2004.) and the Turn Model (see e.g., C. J. Glass and L. M. Ni, "The turn model for adaptive routing," *ACM SIGARCH Comput. Archit. News*, vol. 20, no. 2, pp. 278-287, 1992, doi: 10.1145/146628.140384). The Turn Model is a more general framework for restricting physical routes—it prevents deadlocks by restricting the turns that a physical route can take. In other words, it imposes a total order on the network resources (see e.g., W. J. Dally, and B. P. Towles. *Principles and Practices of Interconnection Networks*. Morgan Kaufmann Publishers, 2004.).

Recently, the use of multipath routing in modern HPC Networks has been the subject of intense study (see e.g. M. Besta et al., "High-Performance Routing With Multipathing and Path Diversity in Ethernet and HPC Networks," IEEE Transactions on Parallel and Distributed Systems, vol. 32, no. 4, pp. 943-959, April 2021, and M. Besta et al., "Fat-Paths: Routing in Supercomputers and Data Centers when Shortest Paths Fall Short," in SC20: International Conference for High Performance Computing, Networking, Storage and Analysis, November 2020, pp. 1-18.). The reason for such interest has to do with the need to increase path diversity. Better path diversity: (1) offers robustness against traffic variations and changes in network capacity (see e.g. P. Key, L. Massoulie, and D. Towsley, "Combining Multipath Routing and Congestion Control for Robustness," in 2006 40th *Annual Conference on Information Sciences and Systems*, Princeton, NJ, USA, 2006, pp. 345-350.); (2) allows adaptive load balance across paths (see e.g. D. Lugones, D. Franco, and E. Luque, "Adaptive Multipath Routing for Congestion Control in InfiniBand Networks," in 2009 *International Conference on Parallel Processing Workshops*, Vienna, Austria, 2009, pp. 222-227. doi: 10.1109/ICPPW.2009.38); (3) allows packet spraying (see e.g., A. Dixit, P. Prakash, Y. C. Hu, and R. R. Kompella, "On the impact of packet spraying in data center networks," in 2013 *Proceedings IEEE INFOCOM*, Turin, Italy, April 2013, pp. 2130-2138. doi: 10.1109/INF-COM.2013.6567015); and (4) maximizes data throughput (see e.g., Y. Jiao, Y. Yang, M. He, M. Yang, and Y. Jiang, "Multi-path Routing for Mesh/Torus-Based NoCs," in Fourth International Conference on Information Technology (ITNG'07), 2007, pp. 734-742).

There are different approaches to providing multipathing. They can generally be grouped as follows:

A. the use of multiple disjointed spanning trees (see e.g., A. Moinet, B. Darties, N. Gastineau, J.-L. Baril, and O. Togni, "Completely independent spanning trees for enhancing the robustness in ad-hoc Networks," in 2017 *IEEE 13th International Conference on Wireless and*

*Mobile Computing, Networking and Communications (WiMob)*, 2017, pp. 63-70. doi: 10.1109/WiMOB.2017.8115791);

B. the use of virtual local area networks, i.e. vLANs (see e.g. M. Besta et al., "High-Performance Routing With Multipathing and Path Diversity in Ethernet and HPC Networks," IEEE Transactions on Parallel and Distributed Systems, vol. 32, no. 4, pp. 943-959, April 2021,);

C. the use of virtual layers, i.e., logical grouping of virtual channels into layers with the property that a flit remains in the same layer from source to destination (see e.g., Y. Jiao, Y. Yang, M. He, M. Yang, and Y. Jiang, "Multi-path Routing for Mesh/Torus-Based NoCs," in Fourth International Conference on Information Technology (ITNG'07), 2007, pp. 734-742); and D. the use of flow optimization methods (see e.g., R. Banner and A. Orda, "Multipath Routing Algorithms for Congestion Minimization," IEEE/ACM Transactions on Networking, vol. 15, no. 2, pp. 413-424, April 2007, doi: 10.1109/TNET.2007.892850.)

Each method presents shortcomings. The first approach (A) is limited by the number of spanning trees that the topology can support, and by the complexity of calculating the set of spanning trees. The second approach (B) is normally linked to the use of Ethernet technology, and is restricted to networks using such technology. The third approach (C) has a strong dependency between path diversity and the number of virtual layers used. This dependency restricts this method to hardware capable of employing a large number of virtual layers. The fourth method (D) creates a flow model and calculates multipaths using optimization methods (see e.g. S. Murali, D. Atienza, L. Benini, and G. De Micheli, "A Method for Routing Packets Across Multiple Paths in NoCs with In-Order Delivery and Fault-Tolerance Guarantees," *VLSI Des.*, vol. 2007, p. e37627, 2007, doi: https://doi.org/10.1155/2007/37627). Unfortunately, this is impractical in real implementations.

In addition, a common problem with these previous approaches is that they do not simultaneously provide deadlock freedom and multipath capability for all source-destination pairs in the network without requiring significant resources. The classical solution used in the industry is to provide a large number of virtual layers. For instance, Z. Alzaid, X. Yuan, and S. Bhowmik, "Multi-Path Routing on the Jellyfish Networks," *ArXiv201202131 Cs*, December 2020, discloses that the number of virtual layers required might be equal to the diameter of the network. The solution disclosed in M. Besta et al., "High-Performance Routing With Multipathing and Path Diversity in Ethernet and HPC Networks," IEEE Transactions on Parallel and Distributed Systems, vol. 32, no. 4, pp. 943-959, April, uses a concept similar to "virtual layers" from Layered shortest path (LASH) routing as disclosed in T. Skeie, O. Lysne, and I. Theiss, "Layered shortest path (LASH) routing in irregular system area networks," in *Proceedings 16th International Parallel and Distributed Processing Symposium*, April 2002, p. 8 pp-. doi: 10.1109/IPDPS.2002.1016559, but the number of virtual layers required is a function of the number of switches/nodes present. The present invention, on the other hand, proposes a more efficient use of available resources, which opens the possibility of its use in energy minimalistic hardware.

M. Besta et al., "High-Performance Routing With Multipathing and Path Diversity in Ethernet and HPC Networks," IEEE Transactions on Parallel and Distributed Systems, vol. 32, no. 4, pp. 943-959, April 2021, doi: 10.1109/TPDS.2020.3035761., provides a comprehensive study of multipathing and path diversity in data centers. According to this study, there are very few known techniques to support multipathing schemes, namely:

ECMP (Equal-cost multipathing). Several paths are stored per destination entry. When it comes to finding a good end-to-end path, several solutions require an optimization algorithm, which does not consider the possibility of deadlock occurrence when multiple sources want to discover paths.

LIS (Location-Identification Separation). It separates the physical location of a given endpoint from its logical identifier. This method may facilitate multipathing by maintaining multiple virtual topologies defined by different mappings, but it also does not address the issue of multipath and deadlock free routing together.

Multi-railing: The presence and use of multiple injection ports per node into a single topology. This is a requirement in almost all multipath systems, but itself is not a solution to providing simultaneous multipath and deadlock free routing.

Multi-planes: Nodes are connected to a set of disjoint topologies, either similar or different, which increases path diversity and available throughput, and it involves the use of virtual layers. However, the number of virtual layers should preferably be minimized in order to minimize hardware resources and lower energy utilization. Current solutions do not implement such minimization.

The techniques that relate to the teachings of the present invention involve multi-railing and multi-planes. The multi-plane technique can be used together with a routing algorithm, such as Up*/Down*, by selecting different roots, one per plane (as described in J. Flich, P. López, J. C. Sancho, A. Robles, and J. Duato, "Improving InfiniBand Routing through Multiple Virtual Networks," in *High Performance Computing*, vol. 2327, H. P. Zima, K. Joe, M. Sato, Y. Seo, and M. Shimasaki, Eds. Berlin, Heidelberg: Springer Berlin Heidelberg, 2002, pp. 49-63. doi: 10.1007/3-540-47847-7_7 and I. Theiss, "Modularity, Routing and Fault Tolerance in Interconnection Networks," University of Oslo, Oslo, 2004.). However, both solutions lack the capacity to deal with high order topologies, and do not make use of inter-layer edge disjointedness, which has the objective of increasing the throughput capability of each source-destination pair. There has been no prior attempt to efficiently use multi-pathing in existing solutions.

Some patent disclosures relating to multi-pathing (such as U.S. Application Publication No. 2006/0133282 A1 to Ramasamy and U.S. Pat. No. 7,724,674 B2 to Lysne), use different mechanisms to address deadlocks. For instance, as a flit is routed from source to destination, if a deadlock turn is detected, the flit may be transitioned to the next layer of higher order to break deadlocks. The number of layers required, however, is not bounded. Another problem relates to the in-balance of routes between layers, and the uneven use of layer resources in these prior art teachings.

Clearly, current and future HPC interconnects, data center networks and other large-scale installations are in need of an appropriate combination of topology and routing algorithm to maximize throughput while minimizing latency degradation for the entire system, i.e. minimizing the lapsed time from injection of a first bit to delivery of the last bit (see e.g. J. Domke, "Routing on the Channel Dependency Graph: A New Approach to Deadlock-Free, Destination-Based, High-Performance Routing for Lossless Interconnection Networks," Technische Universität Dresden, Dresden, 2017.).

The present invention seeks to overcome some of the above-noted problems by providing a routing scheme for direct interconnected networks which generates multiple deadlock-free, and edge-disjoint paths for all source-destination node pairs (SDNP). It is applicable to any topology and can generate deadlock-free multi-path routing, using virtual layers with high efficiency.

SUMMARY OF THE INVENTION

The present invention provides a method of routing for direct interconnect networks which generates multiple intra-layer edge-disjoint paths between all source and destination nodes, while providing deadlock-free routing. The method disclosed herein requires limited use of virtual layers, which makes it suitable for less complex and more energy efficient hardware devices. Also, inter-layer edge-disjointedness is integrated into the preferred embodiment, because it improves the throughput capacity of multipath traffic patterns, but it is not mandatory, and can be relaxed in other embodiments. The invention also allows for distributed route calculation, wherein each node is responsible for generation of its own set of routes without the need for a centralized algorithm controller or elected master (with global knowledge), as it is, for instance, with InfiniBand. The present invention also provides a method of mapping arbitrary topologies from any number of dimensions to two (2) dimensions. In addition, the method makes use of a lower number of turn restrictions than other prior solutions because it uses six direction labels instead of only two labels used in Up*/Down*. This increase in the number of directions translates into a less restrictive set of rules, and consequently, more diversified routing paths.

In one embodiment, the present invention provides a method for determining multiple deadlock-free pathways between nodes for routing packets in a direct interconnect network of n-dimensional topology comprising the steps of: discovering all nodes and all connections between each such nodes in the direct interconnect network of n-dimensional topology, said connections comprising links for data transmission; dividing the direct interconnect network into one or more virtual layers using a limited number of virtual channels, and selecting a distinct root node for each of the one or more virtual layers to act as a reference for dimensional reduction; dimensionally reducing the direct interconnect network of n-dimensional topology to a bi-dimensional topology by mapping each node in the direct interconnect network into an (x, y) coordinate system based on each such node's relative position to the distinct root node within each of the one or more virtual layers; assigning directions for each link from each node and determining turn restrictions to forbid turns that are not deadlock-free; for each of the one or more virtual layers, discovering multiple edge-disjointed pathways between each node that adheres to the turn restrictions, whereby all such discovered pathways are deadlock-free, and each of the one or more virtual layers has a different set of such discovered pathways; and restricting the discovered pathways between each node to those pathways that are intra-layer edge-disjointed.

In another embodiment, the step of discovering all nodes and all connections between each such nodes may comprise a link-state protocol wherein each node in the direct interconnect network exchanges topology information with its nearest neighbor nodes in the direct interconnect network. The link-state protocol may comprise the creation of an adjacency matrix of the nodes in the direct interconnect network.

In yet another embodiment, the step of dividing the direct interconnect network into one or more virtual layers and selecting the distinct root node for each of the one or more virtual layers may include isolating buffer spaces to be used exclusively by each such one or more virtual layers. The method of selecting the distinct root node for each of the one or more virtual layers may be based on the heuristic of "maximum hop-distance possible" or farthest-point heuristic.

In a further embodiment, the step of dimensionally reducing the direct interconnect network of n-dimensional topology to the bi-dimensional topology does not require an initial regular network. In addition, during dimensional reduction, the x coordinate of the (x, y) coordinate system may increase incrementally for each node in the order that nodes are visited by a pre-order traversal starting from the distinct root node, and the y coordinate of the (x, y) coordinate system may represent hop-distance from the distinct root node.

In yet a further embodiment, the step of assigning directions for each link from each node and determining turn restrictions may comprise labeling nodes and connections and assigning a direction to each link channel, such that deadlocks are avoided if certain turns comprising a sequence of two directions are not used by routing pathways. Assigning directions may comprise assigning one of edge direction left-up, left, left-down, right-up, right, or right-down to each link from each node, and determining turn restrictions to forbid turns that are not deadlock-free may comprise only allowing a sequence of two directions that will result in acyclic routing of packets.

In another embodiment, the step of discovering multiple edge-disjointed pathways between each node that adheres to the turn restrictions may further include utilizing a greedy path discovery algorithm to ensure such discovered pathways are shortest pathways between each such node. This step of discovering may further comprise discovering as many such pathways as possible to increase path diversity.

In yet another embodiment, the step of restricting the discovered pathways between each node to those pathways that are edge-disjointed may comprise utilizing the heuristic "shortest-path first".

In yet another embodiment, the discovered pathways are further restricted between each node to those pathways that are also inter-layer edge-disjointed.

In a further embodiment, any intra-layer and inter-layer edge-disjointed pathways may be removed if they do not fall within any hardware or software-based restrictions, including one or more of maximum pathway length, maximum number of pathways, and maximum pathway length difference between pathways.

In yet a further embodiment, the method of the present invention may include the implementation of a routing table that comprises the intra-layer and inter-layer edge-disjointed pathways between nodes.

The present invention further provides a method for deadlock-free routing of packets between nodes along multiple pathways in a direct interconnect network of n-dimensional topology comprising the steps of: discovering all nodes and all connections between each such nodes in the direct interconnect network of n-dimensional topology via use of a link-state protocol, said connections comprising links for data transmission; dividing the direct interconnect network into virtual layers using a limited number of virtual channels, and selecting a distinct root node for each of the virtual layers to act as a reference for dimensional reduction; dimensionally reducing the direct interconnect network of n-dimensional topology to a bi-dimensional topology by mapping each node in the direct interconnect network into an (x, y) coordinate system based on each such node's relative position to the distinct root node within each of the virtual layers, wherein the x coordinate of the (x, y) coordinate system increases incrementally for each node in the order that nodes are visited by a pre-order traversal starting from the distinct root node, and the y coordinate of the (x, y) coordinate system represents hop-distance from the distinct root node; assigning directions for each link from each node comprising assigning one of edge direction left-up, left, left-down, right-up, right, or right-down to each link from each node, and determining turn restrictions to forbid turns that are not deadlock-free comprising only allowing a sequence of two directions that will result in acyclic routing of packets; for each of the virtual layers, discovering multiple edge-disjointed pathways between each node that adheres to the turn restrictions, whereby all such discovered pathways are deadlock-free, and each of the virtual layers has a different set of such discovered pathways, and wherein such discovering utilizes a greedy path discovery algorithm to ensure such discovered pathways are shortest pathways between each such node, and further comprises discovering as many such pathways as possible to increase path diversity; restricting the discovered pathways between each node to those pathways that are intra-layer and inter-layer edge-disjointed; and removing any remaining paths that do not fall within any hardware or software-based restrictions, including one or more of maximum pathway length, maximum number of pathways, and maximum pathway length difference between pathways, and finalizing a routing table.

BRIEF DESCRIPTION OF THE DRAWINGS

The invention will now be described, by way of example, with reference to the accompanying drawings in which:

FIG. 11 is a table showing six edge directions;

FIG. 12 is a table showing a set of turn permissions and prohibitions;

FIG. 16 is a table depicting the preferred merge algorithm applied in some source-destination (src-dst) paths;

FIG. 17 is a table of performance analysis parameters;

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
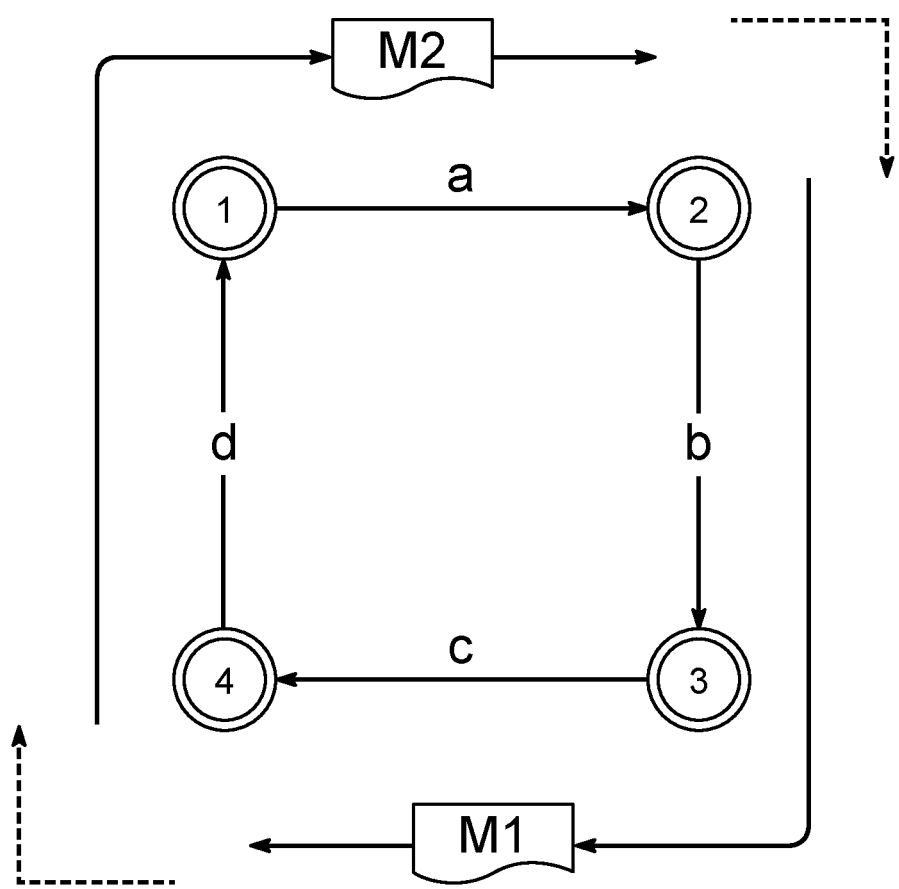
FIG. 1 is a depiction of a deadlock.
Figure 2:
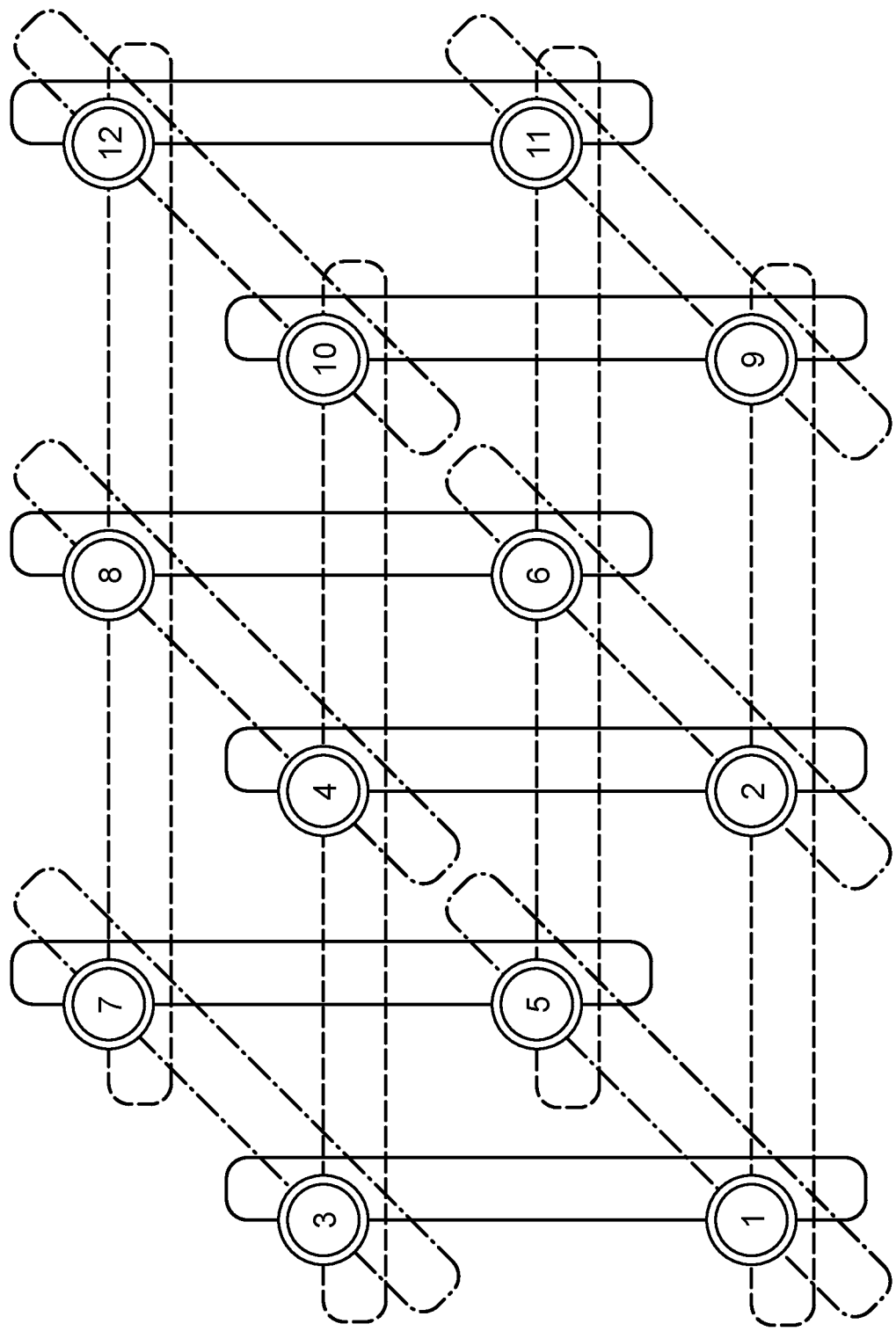
FIG. 2 is a depiction of a torus topology.

A direct interconnect network comprises of a plurality of nodes interconnected to each other via communication links, as depicted in FIG. 2. Such a network does not require specialized interconnecting devices, such as external switches. A message is transmitted between two adjacent nodes and passes over a single link from a source node to a destination node. Transmission between a source node that is not directly connected to a destination node proceeds using a sequence of links and transit nodes.

In direct interconnected networks, there is a clear definition for links, edges, nodes, and virtual channels. A "link" physically connects two adjacent nodes. A link consists of two "edges", one in each direction. A "layer" is defined as a virtual network that is topologically identical to the original network. A layer has virtual channels (i.e., a logical subdivision of physical channels and buffer resources) instead of physical links. For the purposes of the present invention, it can be said that a virtual channel exists only in one specific layer. The transmission of data starting at a source node, continuing through a connected sequence of alternating channels and nodes, and ending in a destination node, is called a "path" or "pathway".

The torus topology has particular importance. Every node in the network is both a terminal and a switch, which makes the advantageous resources of a terminal available to each switch. A torus is a k-ary n-cube, with network size of $N=k^n$ nodes in a regular n-dimensional grid with k nodes in each dimension and channels between nearest neighbors. k could be a different value in any dimension without loss of generality. This topology has interesting properties due to its regular physical arrangement. It provides good path diversity and can have favorable load balance.

Figure 3:
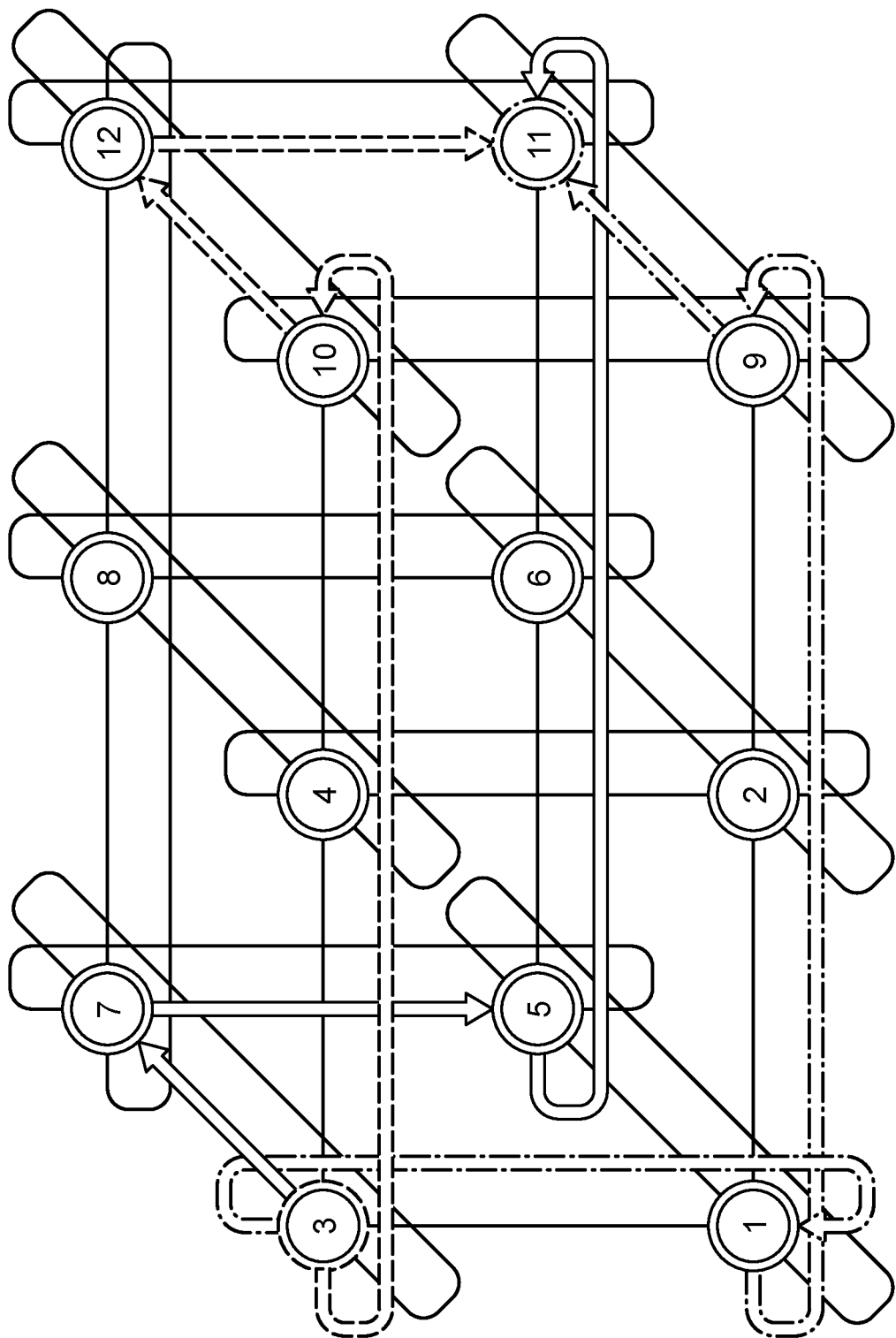
FIG. 3 is a depiction of multipath edge-disjointed routes between nodes 3 and 11.

In a multipath routing scheme, a source node "S" may send flits to a destination node "D" over a set of paths, as shown in FIG. 3 (wherein the source node is shown as node "3" and the destination node is shown as node "11"). This set of paths between a single source-destination pair might include edge overlaps. The present invention contains "no overlaps" (intra-layer edge-disjointedness and preferably also inter-layer edge-disjointedness), or effectively, it outputs a set of edge-disjoint paths. The upper bound number of edge-disjoint paths between a single source-destination pair is the number of interfaces of each node.

When there are many virtual channels, load (the ratio of injected traffic crossing a given channel to the channel bandwidth (bits/s)) is not balanced uniformly across them. So, it is sometimes preferable to allocate more memory to the busy channels and less to the idle channels. However, if one virtual channel can allocate more of the storage and then block, no other virtual channel would be able to make progress. This, in turn, creates a dependency between the virtual channels, and can potentially introduce deadlocks. A description of the dependencies can be rendered using a "Channel Dependency Graph", or CDG. In such a directed graph, the node set consists of the virtual channel set. The edge set is denoted by ordered channel pairs induced by the routing function.

Figure 4:
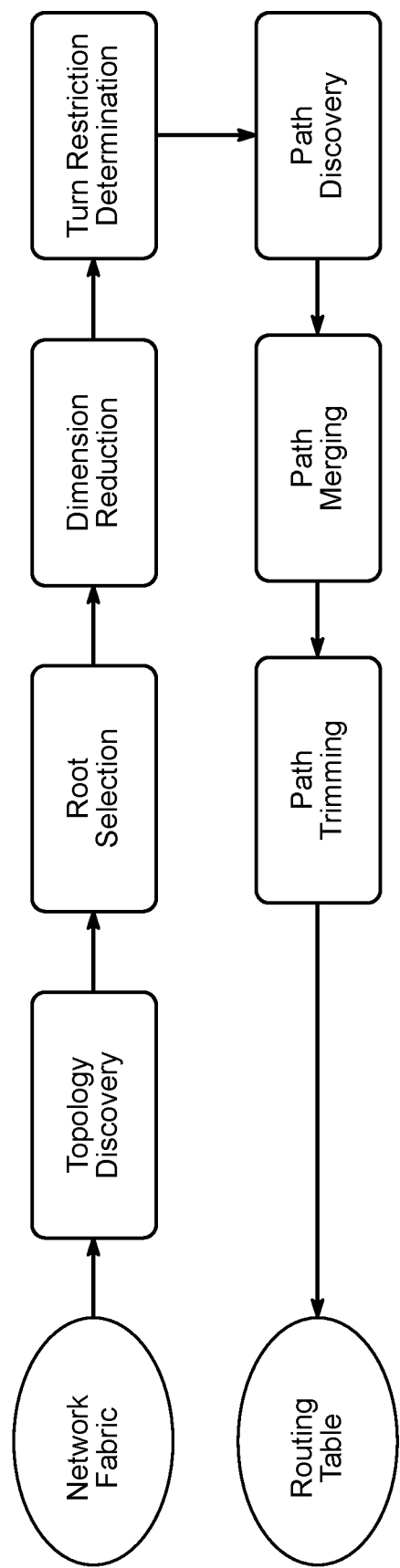
FIG. 4 is a flowchart depicting the preferred steps involved in obtaining a routing table.
Figure 5:
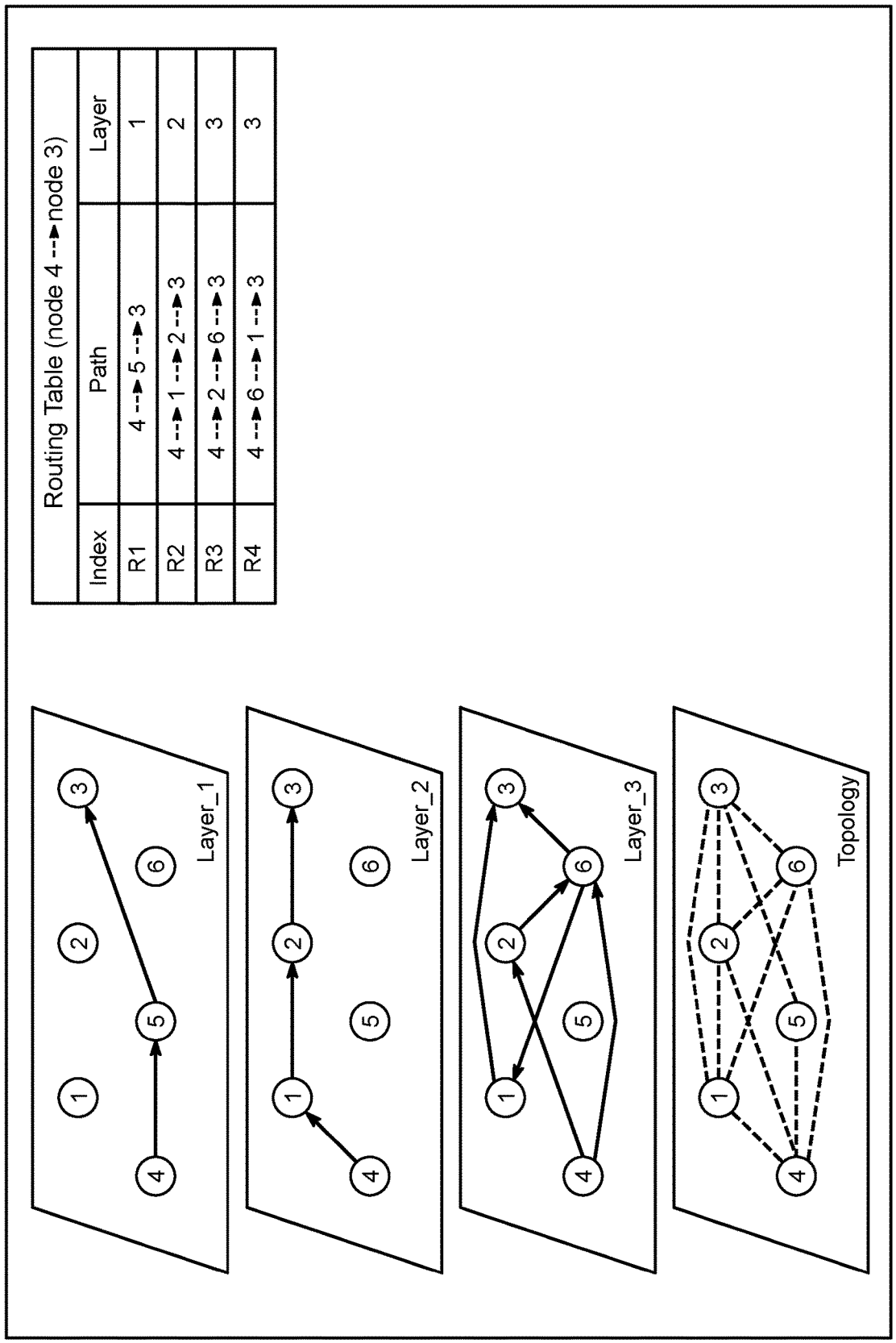
FIG. 5 is a depiction of an example routing table with multiple disjoint paths in different layers.

The following disclosure will teach a person skilled in the art a method of enabling a multipath, deadlock-free, oblivious routing solution, hereinafter referred to as a DFR algorithm. The general overview of the preferred steps required is shown at FIG. 4. A person skilled in the art would understand that the various steps described below need not necessarily occur in the order described and that certain steps may not be necessary at all in certain implementations (i.e. in some embodiments the steps may be performed in a different order, or certain steps may be performed simultaneously, or certain steps may not be necessary). The objective of the DFR algorithm is to produce a set of paths, wherein transmission between each source-destination pair of nodes involves multiple edge-disjointed paths, distributed among several layers, as depicted for example in FIG. 5. The example at FIG. 5 involves the use of 3 virtual layers and shows four routes/paths from node 4 to node 3 (two in separate layers and two in the same layer). As shown, the routes are edge-disjoint in each layer, and also between layers (a preferable embodiment). The routes do not form cycles in separate layers.

Topology Discovery

The first step in the method involves topology discovery, the process of obtaining and maintaining existing network information about nodes and connection relationships between the nodes; ergo the basis to know the existence of network devices and connections. Topology discovery is often implemented, for instance, by the creation of an adjacency matrix of the nodes in a direct interconnect network and is preferably enabled for each node in the network, such that all nodes become aware of the presence of the other nodes. A complete topology can thereby be constructed in each node. The process of topology discovery is known to persons skilled in the art and was previously discussed, for instance, in U.S. Pat. No. 10,142,219 to Oprea et al. The process is also broadly described in ISO/IEC 10589:2002(E) (IS-IS Routing Protocol).

Root Selection

Figure 6:
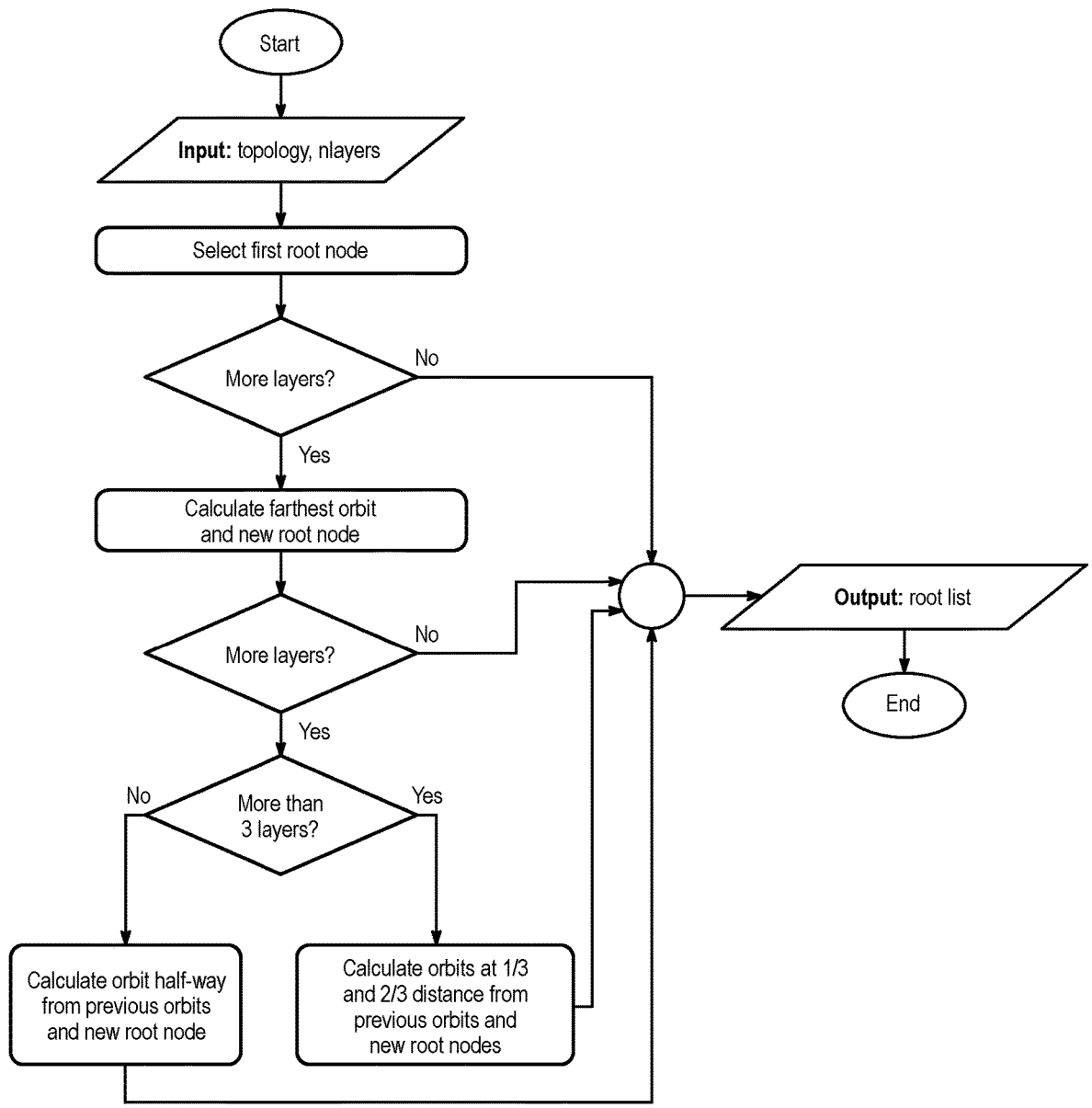
FIG. 6 is a flowchart of the preferred root selection algorithm.
Figure 7:
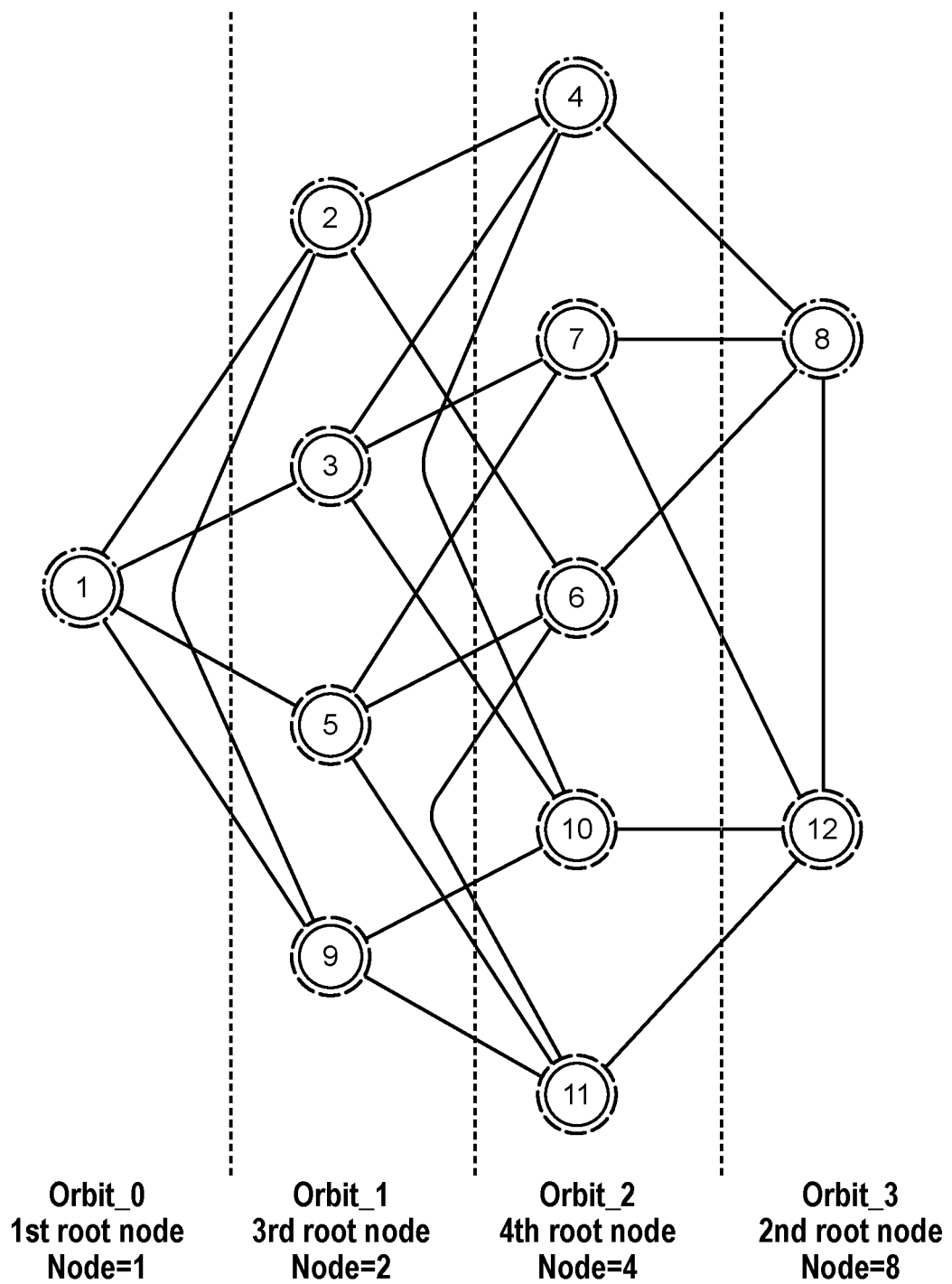
FIG. 7 is a depiction of the concept of orbits for obtaining root nodes.
Figure 8:
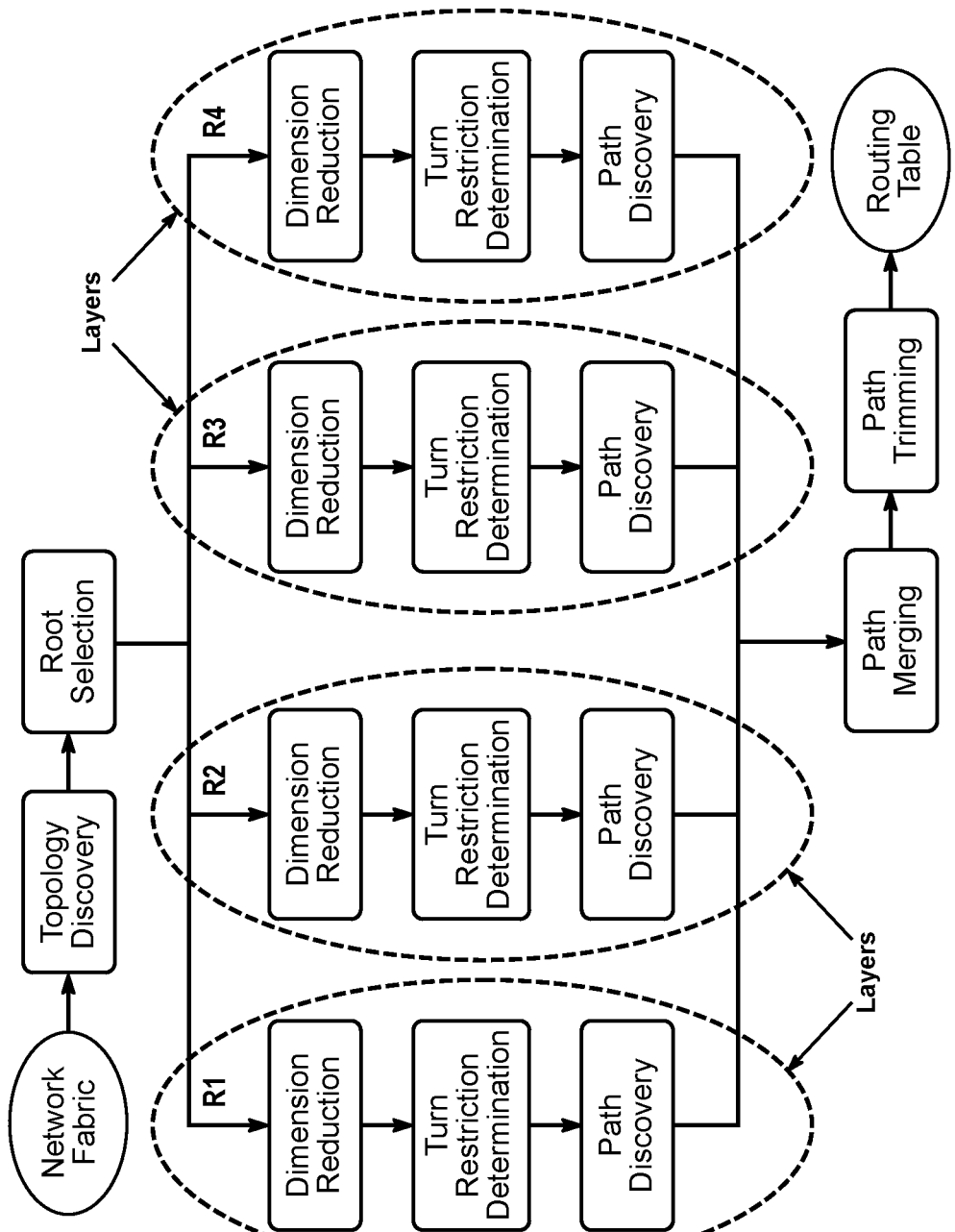
FIG. 8 is a depiction of the preferred routing scheme overview by layer.

The second step involves the division of the network into virtual layers and selection of special nodes to fulfill the role of "root nodes" for the next phase. The physical network is divided into different virtual layers using a limited number of virtual channels. In one embodiment, the hardware may be responsible for this division. Each additional virtual layer requires a specific "root node" to serve as initial reference for the construction of a new coordinate system and mapping of all other nodes into this new coordinate system. The "root node" selected for each virtual layer must be distinct. The reason for such a requirement is that, if the same node is selected as "root node" for two or more layers, these will create the same coordinate system, the same directions and turns, and consequently, the same turn restrictions. Having the same turn restrictions would likely provide the same set of paths, reducing the path diversity. In a preferred embodiment, the "root node" selection is based on the heuristic of "maximum hop-distance possible", meaning that the root nodes should be as far apart as possible. The root node selection algorithm, depicted in FIG. 6, is used for this selection. It uses the concept of "orbits", which is a set of nodes that are at the same hop-distance from the "root node". For the topology shown at FIG. 2, it is possible to distribute the nodes into 4 orbits, as depicted in FIG. 7. In this example, Orbit_3 contains two nodes (8 and 12) that are 3-hops away from the "root node" 1 on Orbit_0. The overall routing scheme can encompass several layers, as shown in FIG. 8.

All nodes in the network must agree (must select) the same group of root nodes, for the same layers. The consistency of the selection is guaranteed in the topology discovery phase, which provides the information about "node IDs" and "links". A preferred embodiment selects root nodes with maximum distance between them. Such selection can generally be optimally made when up to three layers are required. If only one layer is required, any node would suffice. The selection can be deterministically done using a tie-breaker criteria, such as selecting the node with the lowest node ID. If two layers are required, the second root node is preferably selected among the nodes from the farthest orbit. If more than one node is available, the tie-break criteria is again applied. If three layers are required, the next selection will preferably be made using a node from the orbit half-way from the first to the farthest orbits. For the final case of four layers, instead of selecting an orbit half-way from the first and last orbit, two orbits should preferably be selected, one at one-third of the way from the initial orbit, and the other two-thirds away. The root selection algorithm for this part of the method is displayed in the logic flowchart at FIG. 6, and an example of the root nodes selected is shown at FIG. 7. If more than 4 layers are required, another embodiment, using a different heuristic and algorithm, might be used to obtain the root nodes, such as a farthest-point heuristic (see e.g., Z. He, "Farthest-Point Heuristic based Initialization Methods for K-Modes Clustering," arXiv:cs/0610043, October 2006).

Dimension Reduction

The objective of the third step in the method of the present invention is to map a complex (and possibly arbitrary) topology into a well-known and predictable topology, in conjunction with creating a coordinate system where each node is aware of its relative position within the topology. The dimension reduction algorithm for this part of the method is displayed in the logic flowchart at FIG. 9.

Figure 9:
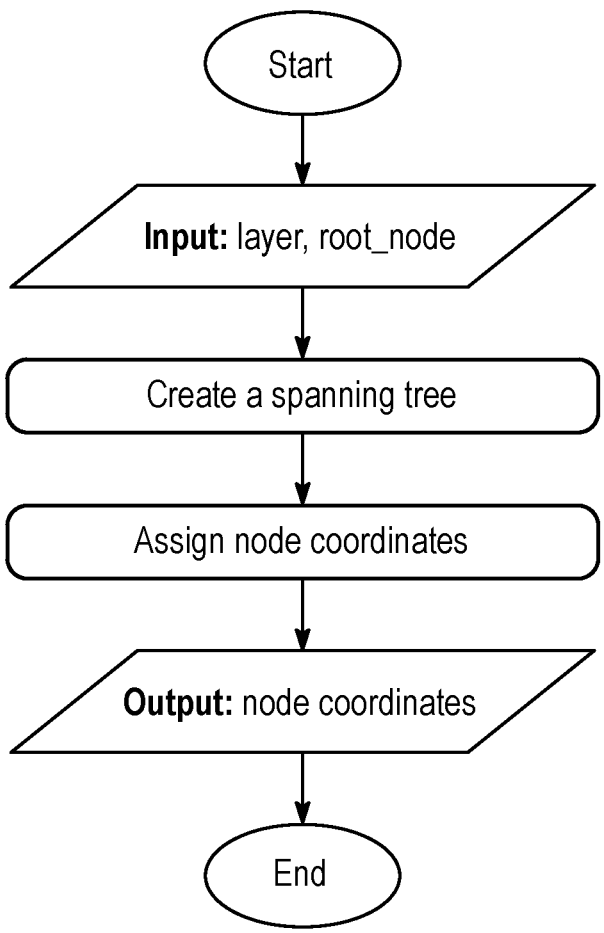
FIG. 9 is a flowchart of the preferred dimension reduction algorithm.

In a preferred embodiment as outlined in FIG. 9, a spanning tree is used to create a coordinate system, and each node position represents its relative position to the spanning tree root node. A person skilled in the art would appreciate that various mapping methods may be used to map a complex topology into a well-known and predictable topology of lower dimension, and that it is possible to use an alternative to the coordinate system (for e.g., cartesian coordinates, polar coordinates).

The first process of the algorithm obtains a spanning tree using the well-known Breadth-First Search algorithm. A person skilled in the art would understand that this action is not limited by any spanning tree (e.g., one created using a Breadth-First Search), and could instead be implemented by, for e.g., a Depth-First Search where the relative position of a node in relation to the other nodes is possible to obtain.

Figure 10:
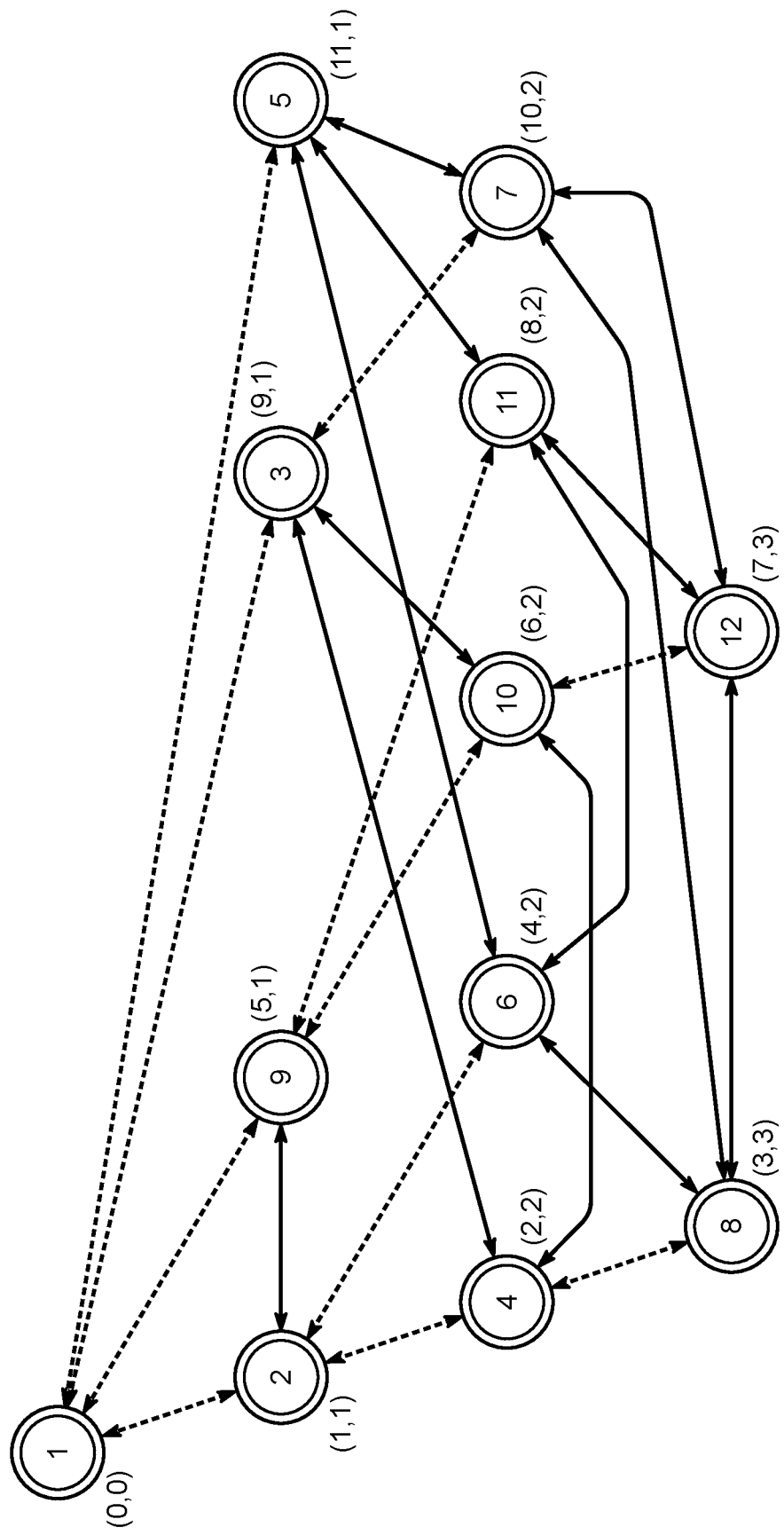
FIG. 10 is a depiction of a 2D mapping tree.

In the second process of the algorithm, coordinates are assigned to nodes in the following way: the root node is designated as coordinate (0,0). The X coordinate increases incrementally for each node in the order that nodes are visited by the pre-order traversal starting from the root node. The Y coordinate is defined as the level of the node (hop-distance from the root node) in the spanning tree. An example of this process as applied to the topology shown at FIG. 2 is displayed at FIG. 10. The parenthesis besides each node represents the node's new coordinate (X, Y). For instance, node 9 has coordinate (5, 1); X=5 means it was the fifth node to be visited, (after nodes 2, 4, 8, 6); Y=1 means that node 9 is located 1 hop away from the root node.

Edge Direction Assignment and Turn Restriction Determination

In the fourth step of the current invention, direction labels are assigned for each edge on the graph, which is used as a basis to define turn restrictions. Once all nodes in the spanning tree have been assigned coordinates (X, Y), it is possible to assign directions for each edge. This action of assigning directions is necessary to later define and restrict turns and avoid deadlocks. The number of different directions in the model influences the number of turn prohibitions. The higher the number of turn prohibitions, the lower will be the number of paths available for selection; therefore, it is important (preferable) to have the largest number of directions possible, to increase the potential number of multipaths, and consequently to allow transmissions at higher throughput. Typical directions are "UP" and "DOWN" as used in the DEC Autonet Up*/Down* routing protocol (see e.g., M. Koibuchi, A. Funahashi, A. Jouraku, and H. Amano, "L-turn routing: an adaptive routing in irregular networks," in International Conference on Parallel Processing, 2001., 2001, pp. 383-392. doi: 10.1109/ICPP.2001.952084). However, it is possible to differentiate other directions such as "LEFT-UP", "LEFT-DOWN" and "RIGHT-UP", and "RIGHT-DOWN", using cross-edge direction assignment. The preferred embodiment of the present invention uses a model with six directions, which creates the possibility of 36 different types of turns. The set of directions can be defined for each edge from node vi to node vj, as set out in the Table at FIG. 11, using the node coordinates defined in previous steps.

In one embodiment, a set of turn permissions (labeled as "True") and prohibitions (labelled as "False") is depicted in the Table at FIG. 12. The definition of which turn will be allowed ("Allowed=True") and which will be forbidden ("Allowed=False") can be done using a CDG (Channel Dependency Graph) that contains all possible directions. Not all turns will be allowed, therefore it is necessary to decide which CDG edges should be removed, for the CDG to become acyclic. The removed edges will constitute the forbidden turns in the model. A preferred embodiment for the set of forbidden turns is listed in the Table at FIG. 12.

Figure 13:
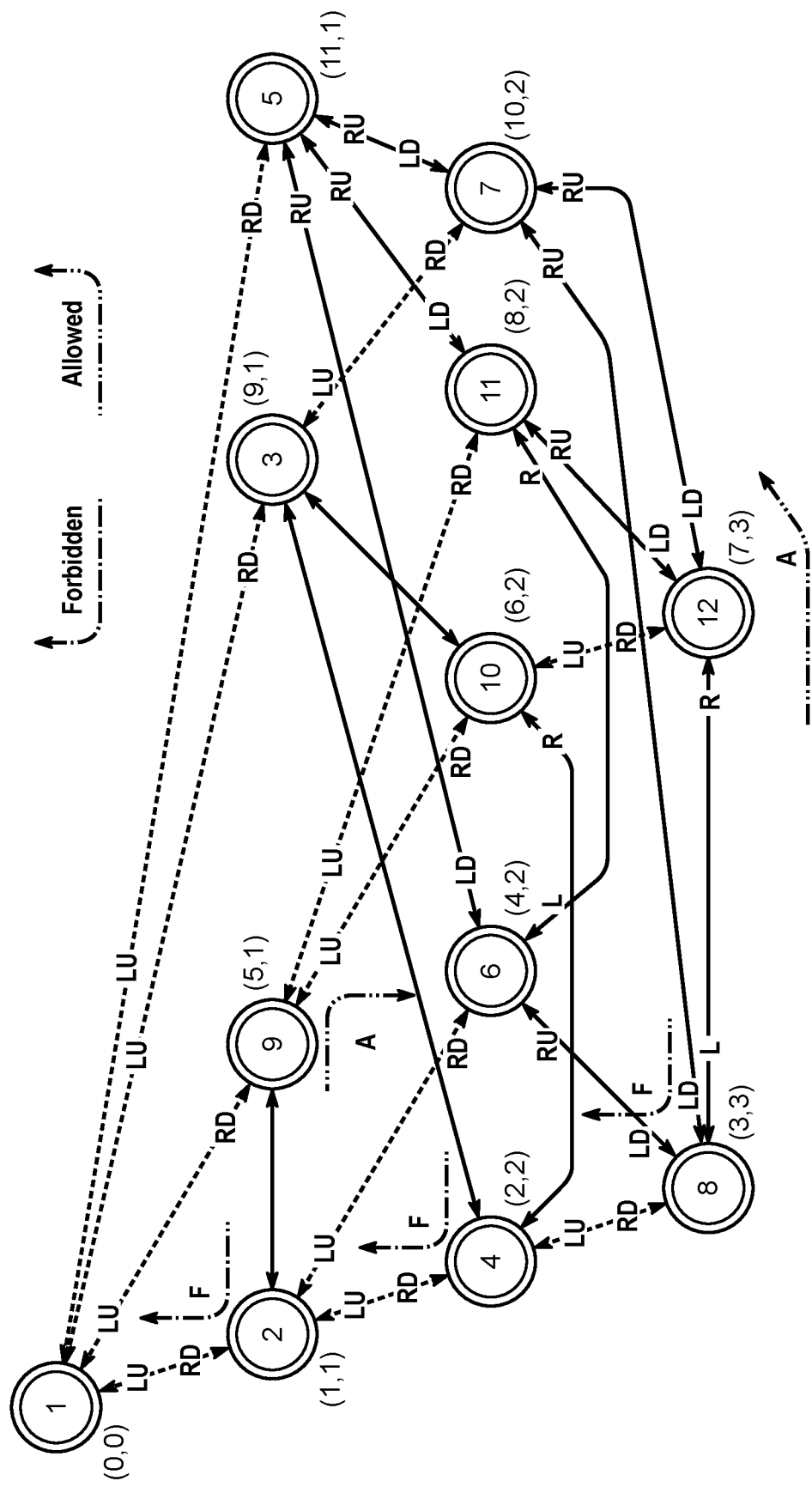
FIG. 13 is a depiction showing forbidden and allowed turns.

By carefully selecting turns to be avoided, a set of deadlock-free paths can be selected. FIG. 13 depicts some allowed and forbidden turns in the 2D mapping tree of FIG. 10. There are different ways to generate prohibited turns, such as the ones proposed in (A) M. Koibuchi, A. Funahashi, A. Jouraku, and H. Amano, "L-turn routing: an adaptive routing in irregular networks," in International Conference on Parallel Processing, 2001., 2001, pp. 383-392. doi: 10.1109/ICPP.2001.952084; (B) Ge-Ming Chiu, "The odd-even turn model for adaptive routing," IEEE Trans. Parallel Distrib. Syst., vol. 11, no. 7, pp. 729-738, 2000, doi: 10.1109/71.877831; and (C) Yau-Ming Sun, Chih-Hsueh Yang, Yeh-Ching Chung, and Tai-Yi Huang, "An efficient deadlock-free tree-based routing algorithm for irregular wormhole-routed networks based on the turn model," in International Conference on Parallel Processing, 2004. ICPP 2004., August 2004, pp. 343-352 vol. 1. doi: 10.1109/ICPP.2004.1327941.

Path Discovery

The fifth step of the current invention involves determining all paths between each pair of nodes in the topology. It should preferably fulfill more than one requirement, namely: the paths must be edge-disjointed per source-destination pair in each layer (referred as intra-layer edge-disjointedness); the paths must not use prohibited turns (to guarantee the deadlock-free property); the paths should preferably be as short as possible (to minimize delay); and the number of paths discovered should preferably be as large as possible (to increase path diversity). Therefore, a solution cannot be obtained by a simple execution of some classical shortest-path algorithm (e.g. Dijkstra).

Obtaining the maximum possible number of edge-disjointed paths with minimum path length has been a core problem for modern communication networks, a solution to which would further increase throughput, failure recovery and redundancy. The present invention adopts an iterative algorithm, based on k consecutive shortest path calculations. Every time a shortest path between two nodes is located, such path is removed from the graph, and a new path is searched. This process is repeated k times, or until no more paths are available.

A person skilled in the art would immediately recognize this step as a variation of K-Shortest-Path problem, where the objective is to list k paths connecting a given source-destination pair in a digraph with minimum total length. A person skilled in the art would also appreciate that various existent algorithms address this problem, such as Yen's algorithm, Suurballe's method for finding disjoint paths, Bhandari's algorithm, and flow-based solutions, among others.

In a multi-layer solution, this process is executed independently on each layer. In other words, each layer will end up with a different set of routes, because each layer will use a different set of restrictions. It is important to obtain the most diverse set of valid routes possible among the layers, because this will improve path diversity. This is the reason why different root nodes and different trees are used for each layer.

Figure 14:
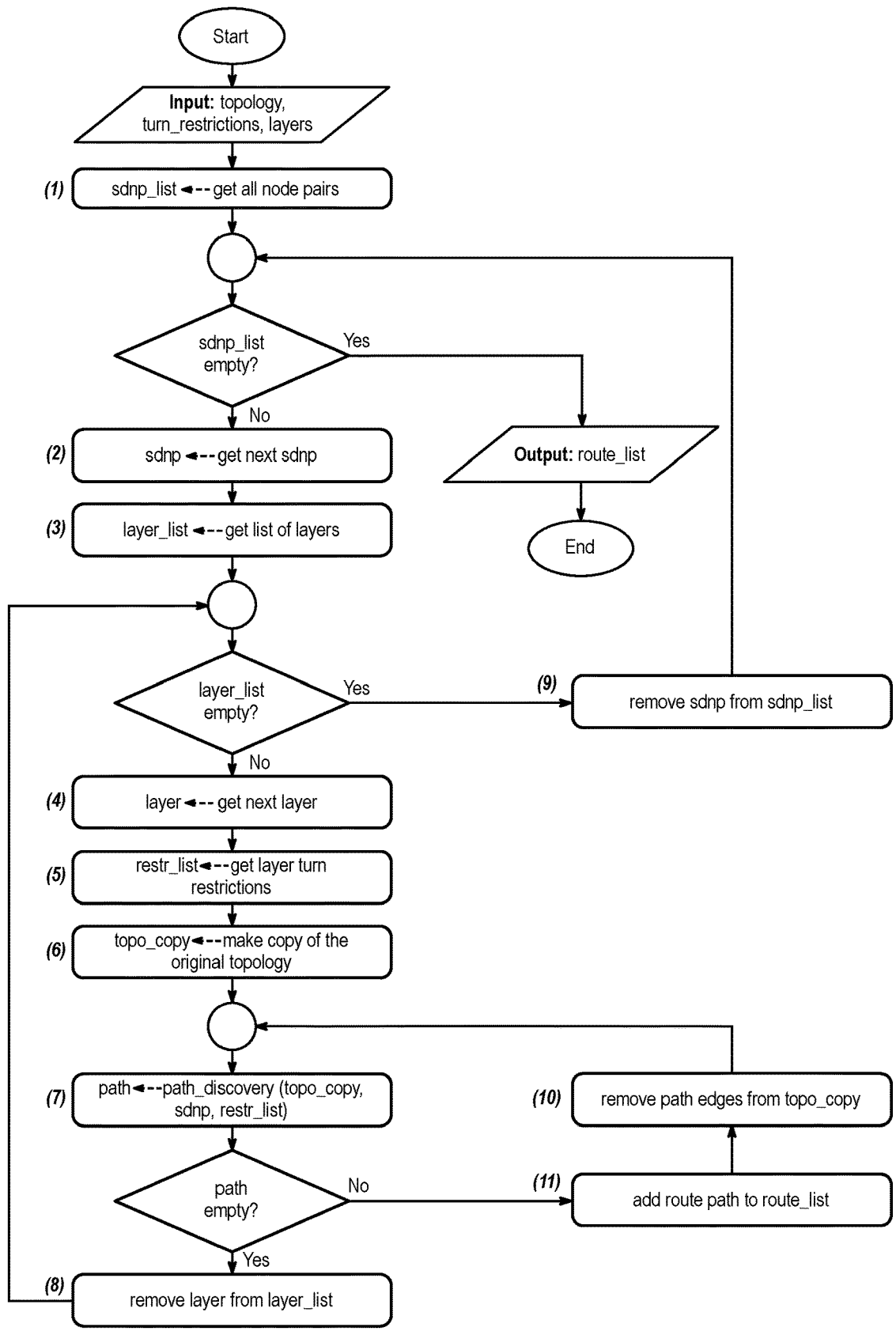
FIG. 14 is a flowchart of the preferred path discovery algorithm.

A preferred embodiment of the current invention is described in FIG. 14. The algorithm input is the topology, the turn restrictions, and the number of layers. The algorithm develops as follows: for each source destination pair (process 1 and 2), for each layer (process 3 and 4), get the set of restrictions for that specific layer (process 5), make a copy of the original topology (process 6), and try to discover a path between source and destination (process 7). If a valid path is discovered, add the new route to the route list (process 11), and remove the edges from this path from the working topology copy (process 10). This removal will guarantee that the paths selected are edge disjointed. In the case where no path is discovered, remove the current layer from the list (process 8) and go to the next layer. In the case where there are more layers available, remove the current source-destination pair from the list (process 9), and process the next pair. If no more pairs are available, the algorithm is complete and the route list is output. Each route entry is composed of source node, destination node, path, and layer that the path belongs to.

Path Merging

The sixth step comprises the actions taken to select paths between each pair of source and destination nodes, among all layers, such that the selected path set is inter-layer edge-disjoint (intra-layer edge-disjointedness is achieved in the previous step). This restriction is important and used in the preferred embodiment, because, in the case of simultaneously using multiple paths (multipathing), the SDNP throughput is not limited by two or more paths competing for a common edge. The objective is to produce as many paths as possible, which follow the disjointedness restriction. Even though inter-layer edge-disjointedness is a desirable property, it can be relaxed, in different forms and degrees, to construct other embodiments of this invention.

Figure 15:
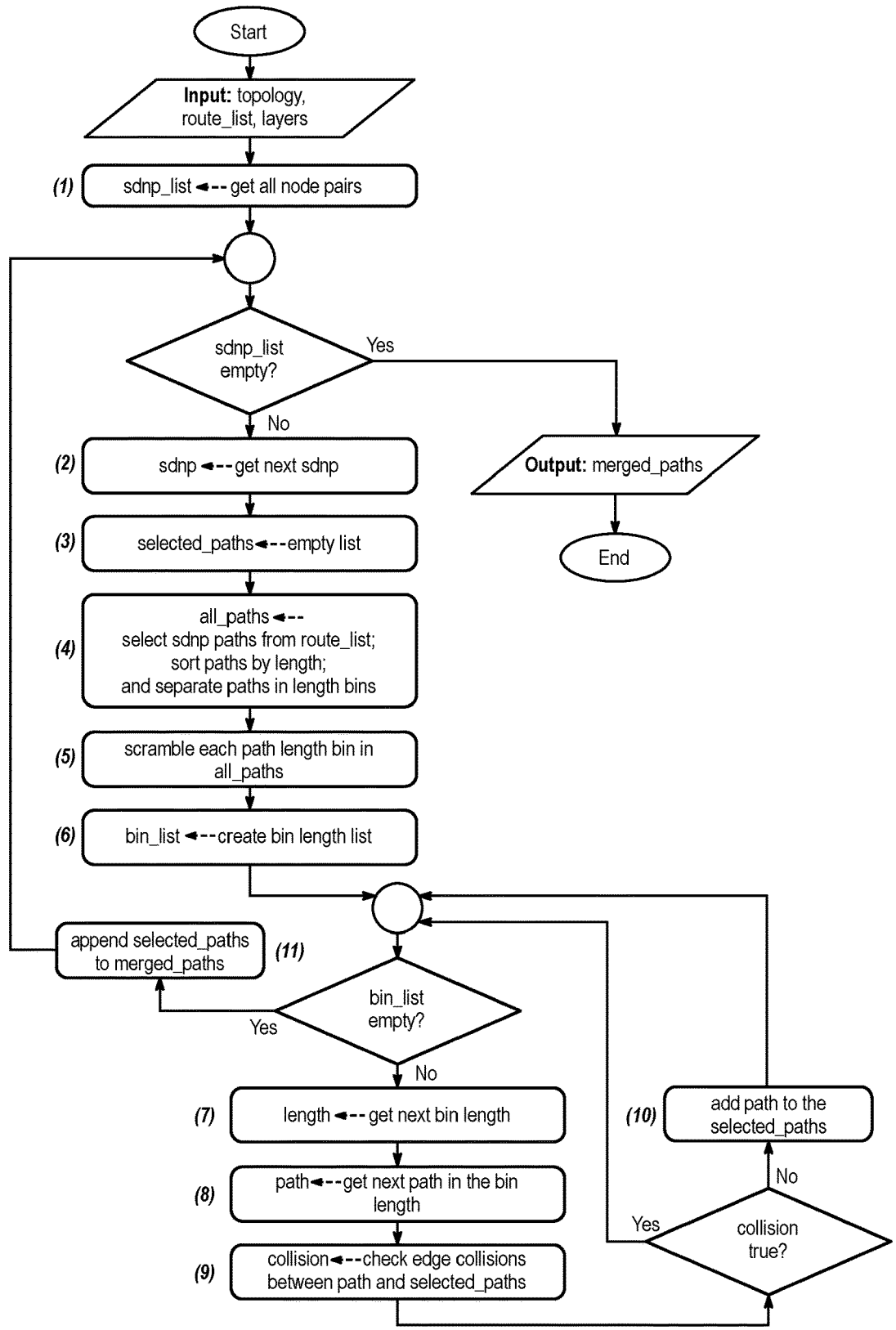
FIG. 15 is a flowchart of the preferred path merging algorithm.

The preferred embodiment of the current invention uses the heuristic of "shortest-path first" to select candidate paths. A person skilled in the art would be aware of alternative heuristics. For instance, instead of the shortest path first, the skilled person could use a random selection to pick candidate paths. The process is displayed in FIG. 15. The algorithm input is the topology, route list and layers. The algorithm develops as follows: for each source-destination pair (process 1 and 2), gather all paths between them from all layers, sort paths by length, separate them into length bins (process 3 and 4), and scramble each bin (process 5). Using increasing length (shorter to longer) create a single list with all bins (process 6 and 7), select one path from the current bin length (process 8), and determine whether this path presents any edge collision (uses the same edge) with the previous selected paths (process 9). If a collision occurs, ignore this path, otherwise add it to the list of selected paths (process 10). After all bins have been checked, append the selected paths to the merged path list (process 11). Proceed until there is no more pairs to check and output the merged paths list.

FIG. 16 provides an example of the selection process. The "Selection" column shows if the path was selected or not, the "Layer" column advises to which layer the path belongs, the "Length" column provides the bin from which each path was selected, the "Order" column presents the path position in the general list of all paths, and the "Path" column contains the edges used by each path. In the case of the paths from src=1 to dst=8, two paths were rejected. The 5th order path was rejected because it has a common edge [(1, 5, 4)] with the path of 1st order (selected before); similarly, the 8th order path was rejected because its path has a common edge with the 6th order path [(12, 8, 1)]. Even though there might be more common edges for a single candidate path, a single common edge is enough for a path be rejected.

Path Trimming

The seventh and final step involves path trimming. It is necessary to prune paths that do not fall within any hardware or software-based restrictions, including, for instance, any maximum path length restrictions, any maximum number of paths restrictions, or maximum path length difference between paths for the same source-destination node pairs. The selection consists of a simple verification if the path properties are in accordance with the establish criteria. Once paths have been trimmed, all the allowed pathways between source and destination nodes are held within a routing table, preferably on each node.

Invention Deployment

In terms of deployment, in one embodiment the methods described herein may be used in association with a direct interconnect network, such as, for example, those implemented in accordance with U.S. Pat. Nos. 9,965,429 and 10,303,640 to Rockport Networks Inc., the disclosures of which are incorporated in their entirety herein by reference. U.S. Pat. Nos. 9,965,429 and 10,303,640 describe systems that provide for the easy deployment of direct interconnect network topologies and disclose a novel method for managing the wiring and growth of direct interconnect networks implemented on torus or higher radix interconnect structures.

The systems of U.S. Pat. Nos. 9,965,429 and 10,303,640 involve the use of a passive patch panel having connectors that are internally interconnected (e.g., in a mesh) within the passive patch panel. To provide the ability to easily grow the network structure, the connectors are initially populated by interconnect plugs to initially close the ring connections. By simply removing and replacing an interconnect plug with a connection to a node, the node is discovered and added to the network structure. If a person skilled in the art of network architecture desired to interconnect all the nodes in such a passive patch panel at once, there are no restrictions—the nodes can be added in random fashion. This approach greatly simplifies deployment, as nodes are added/connected to connectors without any special connectivity rules, and the integrity of the torus structure is maintained.

In another preferred embodiment, the methods disclosed herein may be used in association with devices that interconnect nodes in a direct interconnect network (i.e., shuffles) as described in PCT Publication No. WO 2022/096927 A1 to Rockport Networks Inc., the disclosure of which is incorporated in its entirety herein by reference. The shuffles described therein are novel optical interconnect devices capable of providing the direct interconnection of nodes in various topologies as desired (including torus, dragonfly, slim fly, and other higher radix topologies for instance) by connecting fiber paths from a node(s) to fiber paths of other node(s) within an enclosure to create optical channels between the nodes. This assists in optimizing networks by moving the switching function to the endpoints. The optical paths in the shuffles of PCT Publication No. WO 2022/096927 A1 are pre-determined to create the direct interconnect structure of choice, and the internal connections are preferably optimized such that when nodes are connected to a shuffle in a predetermined manner an optimal direct interconnect network is created during build-out.

The nodes themselves may potentially be any number of different devices, including but not limited to processing units, memory modules, I/O modules, PCIe cards, network interface cards (NICs), PCs, laptops, mobile phones, servers (e.g., application servers, database servers, file servers, game servers, web servers, etc.), or any other device that is capable of creating, receiving, or transmitting information over a network. As an example, in one preferred embodiment, the node may be a network card, such as a Rockport RO6100 Network Card, as described in PCT Publication No. WO 2022/096927 A1. Such network cards are installed in servers, but use no server resources (CPU, memory, and storage) other than power, and appear to be an industry-standard Ethernet NIC to the Linux operating system. Each Rockport RO6100 Network Card supports an embedded 400 Gbps switch (twelve 25 Gbps network links; 100 Gbps host bandwidth) and contains software that implements the switchless network over the shuffle topology (see e.g., the methods of routing packets in U.S. Pat. Nos. 10,142,219 and 10,693,767 to Rockport Networks Inc., the disclosures of which are incorporated in their entirety herein by reference).

Invention Performance

The increase in the path diversity resulting from the present invention has been credited for increasing robustness against traffic variations and changes in network capacity, for allowing better adaptive load balance across paths, for allowing better packet spraying, and ultimately for maximizing data throughput. The current invention provides an elevated path diversity for all source-destination node pairs. Example results can be seen in FIGS. 17 to 20.

In the table depicted at FIG. 17, there are three examples of torus topologies where the invention has been used. The topology makes use of shuffles described in PCT Publication No. WO 2022/096927 A1. The total amount of routes produced is listed in the last column.

Figure 18:
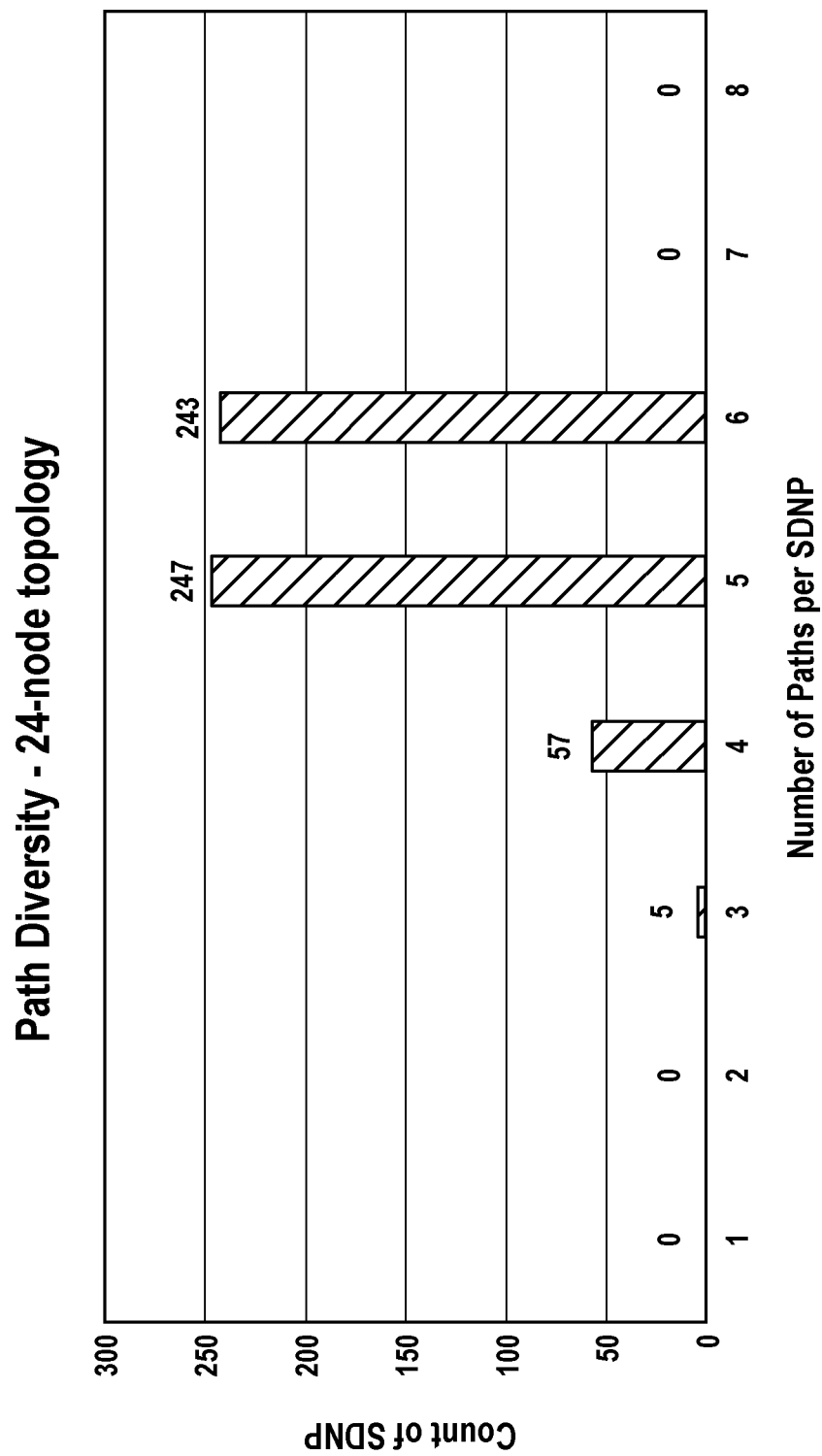
FIG. 18 is a chart of path diversity for a 24-node topology.
Figure 19:
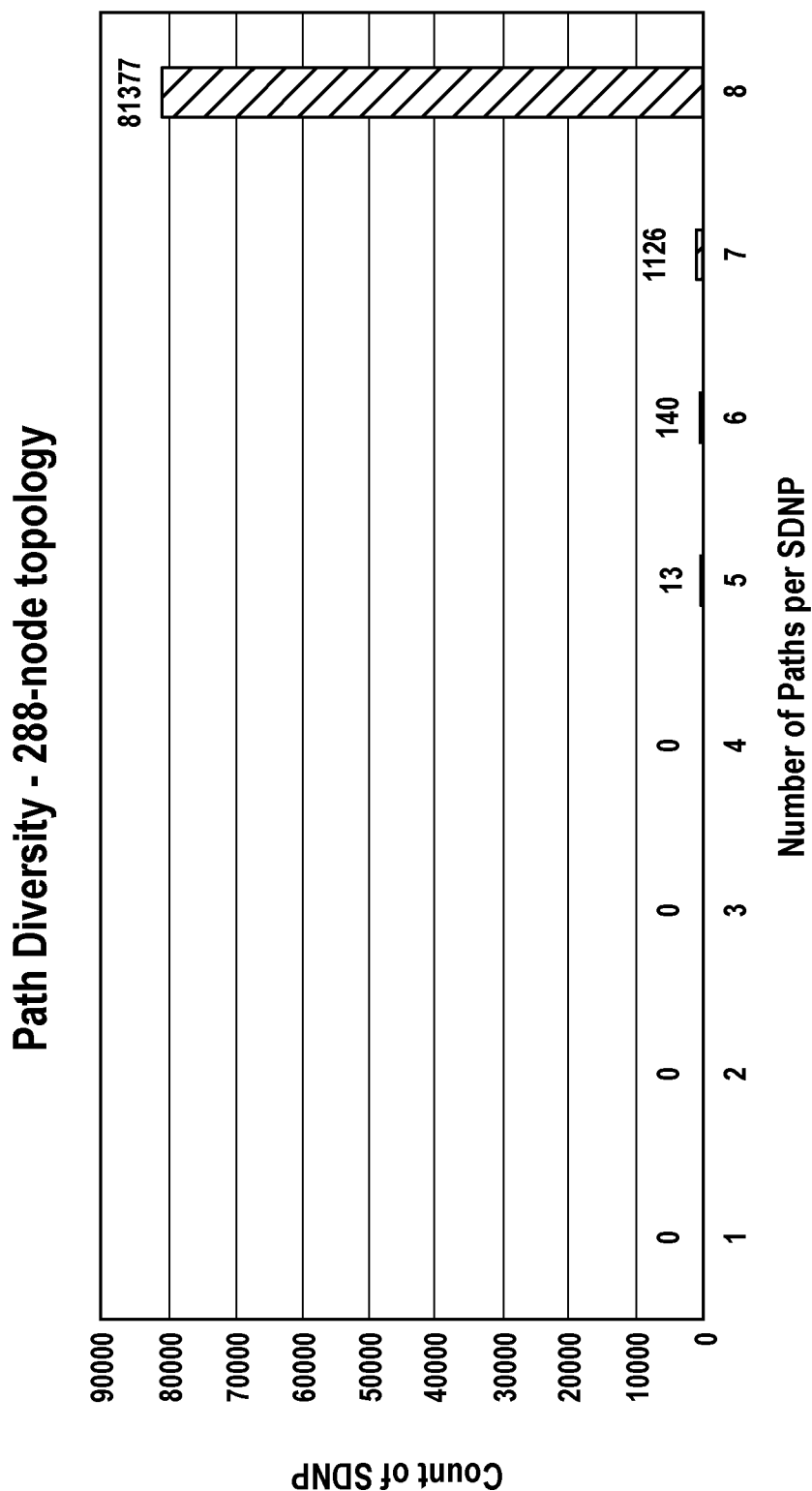
FIG. 19 is a chart of path diversity for a 288-node topology.
Figure 20:
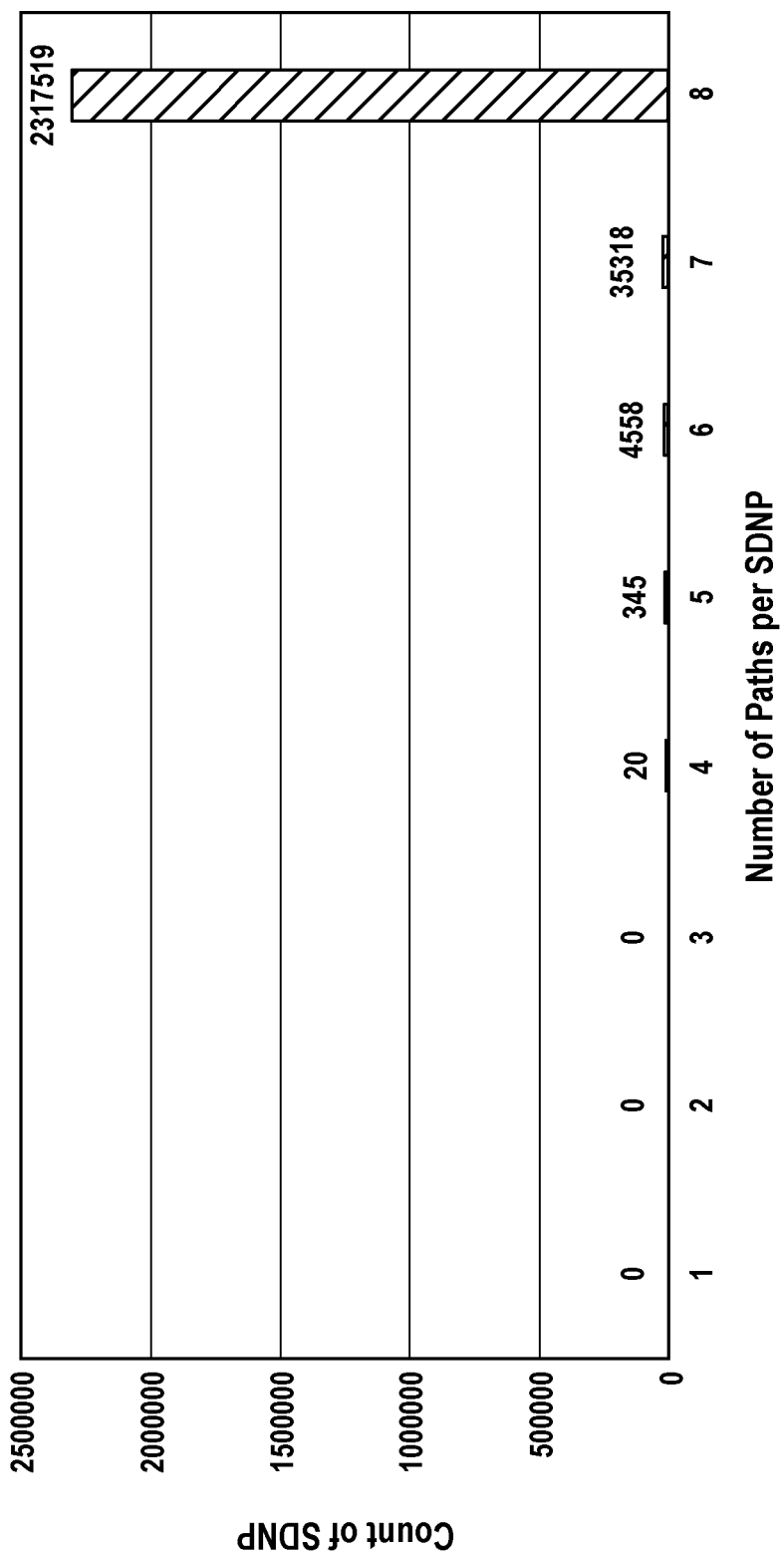
FIG. 20 is a chart of path diversity for a 1536-node topology.

FIGS. 18 to 20 show path diversity. It is important to note that the 24-node topology (FIG. 18) only has 6 interfaces, and therefore, no more than 6 edge-disjointed paths are possible. The trimming parameter for maximum number of paths is set to 8 on the 288-node (FIG. 19) and 1536-node (FIG. 20) topologies, and therefore, no more than 8 paths per SDNP are possible. These results show an elevated level of path diversity for all source-destination node pairs.

Although specific embodiments of the invention have been described, it will be apparent to one skilled in the art that variations and modifications to the embodiments may be made within the scope of the following claims.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Thus the scope of the invention should be determined by the appended claims and their legal equivalents, and not by the examples given.

I claim:

1. A method for determining multiple deadlock-free pathways between nodes for routing packets in a direct interconnect network of n-dimensional topology comprising the steps of:
    discovering all nodes and all connections between each such nodes in the direct interconnect network of n-dimensional topology, said connections comprising links for data transmission;
    dividing the direct interconnect network into one or more virtual layers using a limited number of virtual channels, and selecting a distinct root node for each of the one or more virtual layers to act as a reference for dimensional reduction;
    dimensionally reducing the direct interconnect network of n-dimensional topology to a bi-dimensional topology by mapping each node in the direct interconnect network into an (x, y) coordinate system based on each such node's relative position to the distinct root node within each of the one or more virtual layers;
    assigning directions for each link from each node and determining turn restrictions to forbid turns that are not deadlock-free;
    for each of the one or more virtual layers, discovering multiple edge-disjointed pathways between each node that adheres to the turn restrictions, whereby all such discovered pathways are deadlock-free, and each of the one or more virtual layers has a different set of such discovered pathways; and
    restricting the discovered pathways between each node to those pathways that are intra-layer edge-disjointed.

2. The method of claim 1 wherein the step of discovering all nodes and all connections between each such nodes comprises a link-state protocol wherein each node in the direct interconnect network exchanges topology information with its nearest neighbor nodes in the direct interconnect network.

3. The method of claim 2 wherein the link-state protocol comprises the creation of an adjacency matrix of the nodes in the direct interconnect network.

4. The method of claim 3 wherein the step of dividing the direct interconnect network into one or more virtual layers and selecting the distinct root node for each of the one or more virtual layers includes isolating buffer spaces to be used exclusively by each such one or more virtual layers.

5. The method of claim 4 wherein the step of selecting the distinct root node for each of the one or more virtual layers is based on the heuristic of "maximum hop-distance possible" or farthest-point heuristic.

6. The method of claim 5 wherein the step of dimensionally reducing the direct interconnect network of n-dimensional topology to the bi-dimensional topology does not require an initial regular network.

7. The method of claim 6 wherein the x coordinate of the (x, y) coordinate system increases incrementally for each node in the order that nodes are visited by a pre-order traversal starting from the distinct root node, and the y coordinate of the (x, y) coordinate system represents hop-distance from the distinct root node.

8. The method of claim 7 wherein the step of assigning directions for each link from each node and determining turn restrictions comprises labeling nodes and connections and assigning a direction to each link channel, such that deadlocks are avoided if certain turns comprising a sequence of two directions are not used by routing pathways.

9. The method of claim 7 wherein the step of assigning directions comprises assigning one of edge direction left-up, left, left-down, right-up, right, or right-down to each link from each node.

10. The method of any one of claims 1 to 7 or claim 9 wherein the step of determining turn restrictions to forbid turns that are not deadlock-free comprises only allowing a sequence of two directions that will result in acyclic routing of packets.

11. The method of claim 10 wherein the step of discovering multiple edge-disjointed pathways between each node that adheres to the turn restrictions further includes utilizing a greedy path discovery algorithm to ensure such discovered pathways are shortest pathways between each such node.

12. The method of claim 11 wherein the step of discovering multiple edge-disjointed pathways between each node that adheres to the turn restrictions further comprises discovering as many such pathways as possible to increase path diversity.

13. The method of claim 12 wherein the step of restricting the discovered pathways between each node to those pathways that are intra-layer edge-disjointed comprises utilizing the heuristic "shortest-path first".

14. The method of claim 13 wherein the discovered pathways are further restricted between each node to those pathways that are also inter-layer edge-disjointed.

15. The method of claim 14 further including removing any edge-disjointed pathways that do not fall within any hardware or software-based restrictions.

16. The method of claim 15 wherein the hardware or software-based restrictions include one or more of maximum pathway length, maximum number of pathways, and maximum pathway length difference between pathways.

17. The method of claim 16 further including the implementation of a routing table comprising the edge-disjointed pathways between nodes.

18. Routing packets between nodes along multiple pathways in a direct interconnect network comprising utilizing the method for determining multiple deadlock-free pathways between nodes of claim 17.

19. A method for deadlock-free routing of packets between nodes along multiple pathways in a direct interconnect network of n-dimensional topology comprising the steps of:
  discovering all nodes and all connections between each such nodes in the direct interconnect network of n-dimensional topology via use of a link-state protocol, said connections comprising links for data transmission;
  dividing the direct interconnect network into virtual layers using a limited number of virtual channels, and selecting a distinct root node for each of the virtual layers to act as a reference for dimensional reduction;
  dimensionally reducing the direct interconnect network of n-dimensional topology to a bi-dimensional topology by mapping each node in the direct interconnect network into an (x, y) coordinate system based on each such node's relative position to the distinct root node within each of the virtual layers, wherein the x coordinate of the (x, y) coordinate system increases incrementally for each node in the order that nodes are visited by a pre-order traversal starting from the distinct root node, and the y coordinate of the (x, y) coordinate system represents hop-distance from the distinct root node; assigning directions for each link from each node comprising assigning one of edge direction left-up, left, left-down, right-up, right, or right-down to each link from each node, and determining turn restrictions to forbid turns that are not deadlock-free comprising only allowing a sequence of two directions that will result in acyclic routing of packets;
  for each of the virtual layers, discovering multiple edge-disjointed pathways between each node that adheres to the turn restrictions, whereby all such discovered pathways are deadlock-free, and each of the virtual layers has a different set of such discovered pathways, and wherein such discovering utilizes a greedy path discovery algorithm to ensure such discovered pathways are shortest pathways between each such node, and further comprises discovering as many such pathways as possible to increase path diversity;
  restricting the discovered pathways between each node to those pathways that are intra-layer and inter-layer edge-disjointed; and
  removing any remaining paths that do not fall within any hardware or software-based restrictions, including one or more of maximum pathway length, maximum number of pathways, and maximum pathway length difference between pathways, and finalizing a routing table.

* * * * *